United States Patent
Sogame et al.

(10) Patent No.: US 11,426,929 B2
(45) Date of Patent: Aug. 30, 2022

(54) POWDER MATERIAL FOR PRODUCING THREE-DIMENSIONAL OBJECT, KIT FOR PRODUCING THREE-DIMENSIONAL OBJECT, AND THREE-DIMENSIONAL OBJECT PRODUCING METHOD AND APPARATUS

(71) Applicant: RICOH COMPANY, LTD., Tokyo (JP)

(72) Inventors: Junjiroh Sogame, Shizuoka (JP); Kohsuke Miyazaki, Kanagawa (JP); Takumi Yokoyama, Shizuoka (JP); Shinichiroh Satoh, Tokyo (JP); Takafumi Sasaki, Kanagawa (JP); Osamu Mizuta, Tokyo (JP); Hiroyuki Miyata, Kanagawa (JP); Naoki Oya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 83 days.

(21) Appl. No.: 16/918,128

(22) Filed: Jul. 1, 2020

(65) Prior Publication Data

US 2021/0001543 A1    Jan. 7, 2021

(30) Foreign Application Priority Data

Jul. 4, 2019 (JP) .............................. JP2019-125604
May 29, 2020 (JP) .............................. JP2020-094401

(51) Int. Cl.
*B29C 64/153* (2017.01)
*B33Y 10/00* (2015.01)
(Continued)

(52) U.S. Cl.
CPC ............ *B29C 64/153* (2017.08); *B33Y 10/00* (2014.12); *B33Y 70/00* (2014.12); *B33Y 80/00* (2014.12); *B29K 2101/00* (2013.01)

(58) Field of Classification Search
None
See application file for complete search history.

(56) References Cited

U.S. PATENT DOCUMENTS 10,029,440 B2  7/2018  Sato
2006/0165546 A1  7/2006  Yamada et al.
(Continued)

FOREIGN PATENT DOCUMENTS

EP  3 219 410 A1  9/2017
GB  1232256 A  *  5/1971
(Continued)

OTHER PUBLICATIONS

Extended European Search Report dated Oct. 8, 2020 in European Patent Application No. 20183756.4, 9 pages.

*Primary Examiner* — Mohammad M Ameen
(74) *Attorney, Agent, or Firm* — Grüneberg and Myers PLLC

(57) ABSTRACT

Provided is a powder material for producing a three-dimensional object including: a base material; a resin; and resin particles, wherein an amount W (mass %) of carbon remaining in the powder material after heating in a vacuum of $10^{-2}$ Pa or lower at 450 degrees C. for 2 hours satisfies the following formula: W (mass %)<0.9/M, where M represents the specific gravity of the base material.

20 Claims, 2 Drawing Sheets

(51) Int. Cl.
  *B33Y 70/00*   (2020.01)
  *B33Y 80/00*   (2015.01)
  *B29K 101/00*  (2006.01)

(56)         References Cited

U.S. PATENT DOCUMENTS

2006/0251535 A1*  11/2006  Pfeifer ................. B29C 41/003
                                                      419/36
2016/0160021 A1    6/2016  Kojima et al.
2016/0177122 A1    6/2016  Naruse et al.
2016/0200908 A1    7/2016  Osaka et al.
2016/0236412 A1    8/2016  Kusahara et al.
2016/0271695 A1    9/2016  Osaka et al.
2016/0271877 A1    9/2016  Suzuki et al.
2016/0271879 A1    9/2016  Yamashita et al.
2016/0272817 A1*   9/2016  Naruse ..................... B22F 3/22
2016/0272844 A1    9/2016  Osaka et al.
2016/0288206 A1   10/2016  Ohtaki et al.
2016/0368806 A1   12/2016  Yamaguchi et al.
2017/0209927 A1    7/2017  Yamashita et al.
2017/0259456 A1    9/2017  Sasaki et al.
2018/0369908 A1   12/2018  Muto et al.

FOREIGN PATENT DOCUMENTS

JP        2000-328106     11/2000
JP        2003-048253      2/2003
JP        2005-297325     10/2005
JP        2006-200030      8/2006
JP        2016-028872      3/2016
JP             5920498     4/2016
WO     WO 2018/173755 A1   9/2018

\* cited by examiner

POWDER MATERIAL FOR PRODUCING THREE-DIMENSIONAL OBJECT, KIT FOR PRODUCING THREE-DIMENSIONAL OBJECT, AND THREE-DIMENSIONAL OBJECT PRODUCING METHOD AND APPARATUS

CROSS-REFERENCE TO RELATED APPLICATIONS

The present application claims priority under 35 U.S.C. § 119 to Japanese Patent Application No. 2019-125604 filed Jul. 4, 2019 and Japanese Patent Application No. 2020-094401 filed May 29, 2020. The contents of which are incorporated herein by reference in their entirety.

BACKGROUND OF THE INVENTION

Field of the Invention

The present disclosure relates to a powder material for producing a three-dimensional object, a kit for producing a three-dimensional object, and a three-dimensional object producing method and apparatus.

Description of the Related Art

In recent year, there have been increasing needs for small-lot production of complicated, minute three-dimensional objects. As the techniques for catering to the needs, for example, a powder sintering method and a powder bonding method have been proposed (for example, see Japanese Unexamined Patent Application Publication Nos. 2000-328106, 2006-200030, and 2003-48253).

The powder sintering method forms a thin layer of a powder, irradiates the thin layer with laser light to form a thin sintered body, and repeats these operations to sequentially laminate one thin sintered body over another thin sintered body to obtain a desired three-dimensional object. The powder bonding method hardens a thin layer of a powder using an adhesive material instead of performing laser sintering as in the powder sintering method, and laminates such hardened thin layers to obtain a desired three-dimensional object.

Examples of the methods proposed as the powder bonding method include a method of supplying an adhesive material to a thin layer of a powder by an inkjet method, a method of laminating layers of a powder material in which powder particles and adhesive particles are mixed, applying a binder to the layers to dissolve and solidify the adhesive particles to produce a three-dimensional object, and a method of producing a three-dimensional object with a powder material formed of a base material such as glass or ceramics coated with a hydrophobic resin, by dissolving and solidifying the coating resin with a hydrophobic solvent such as limonene (for example, see Japanese Unexamined Patent Application Publication No. 2005-297325).

Another proposed three-dimensional object producing method uses a hardening liquid formed of a select material in order to prevent clogging or increase the options of adhesive materials that can be used (for example, see Japanese Patent No. 5920498).

SUMMARY OF THE INVENTION

According to one aspect of the present disclosure, a powder material for producing a three-dimensional object includes a base material, a resin, and resin particles. An amount W (mass %) of carbon remaining in the powder material after heating in a vacuum of $10^{-2}$ Pa or lower at 450 degrees C. for 2 hours satisfies the following formula: W (mass %)<0.9/M, where M represents the specific gravity of the base material.

Figure 1A:
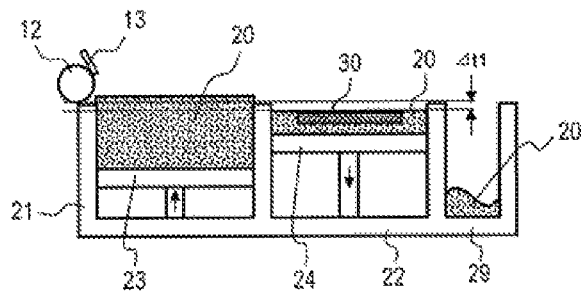
FIG. 1A is a schematic view illustrating an example operation of a three-dimensional object producing apparatus of the present disclosure.

DESCRIPTION OF THE EMBODIMENTS (Powder Material for Producing Three-Dimensional Object)

A powder material for producing a three-dimensional object of the present disclosure contains a base material, a resin, and resin particles, and further contains other components as needed.

In the powder material for producing a three-dimensional object of the present disclosure, it is preferable that the resin contain a nonaqueous first resin, and that the powder material for producing a three-dimensional object contain a coating film formed of the resin and coating the surface of the base material.

In the powder material for producing a three-dimensional object of the present disclosure, it is preferable that the resin particles contain a second resin, and that the powder material for producing a three-dimensional object contain the resin particles over the coating film.

The powder material for producing a three-dimensional object of the present disclosure is suitably used in a three-dimensional object producing method of the present disclosure and a three-dimensional object producing apparatus of the present disclosure described below.

The present disclosure has an object to provide a powder material for producing a three-dimensional object capable of producing a three-dimensional object excellent in strength before sintering, high sintered density, and dimensional accuracy.

The present disclosure can provide a powder material for producing a three-dimensional object capable of producing a three-dimensional object excellent in strength before sintering, high sintered density, and dimensional accuracy.

The amount W (mass %) of carbon remaining in the powder material for producing a three-dimensional object of the present disclosure after heating in a vacuum of $10^{-2}$ Pa or lower at 450 degrees C. for 2 hours satisfies the following formula: W (mass %)<0.9/M, where M represents the specific gravity of the base material.

When AlSi10 Mg described below is used as the base material, the value M (g/cm$^3$) is 2.65 g/cm$^3$, and the value W (mass %) is lower than 0.34 and preferably lower than 0.17. When the value W (mass %) is lower than 0.34, a three-dimensional object having a high sintered density can be obtained.

When titanium described below is used as the base material, the value M (g/cm$^3$) is 4.51 g/cm$^3$, and the value W (mass %) is lower than 0.20 and preferably lower than 0.10. When the value W (mass %) is lower than 0.20, a three-dimensional object having a high sintered density can be obtained.

The amount W (mass %) of remaining carbon can be measured by the following measuring method.

First, the powder material for producing a three-dimensional object of the present disclosure is heated in a known vacuum degreasing furnace under the conditions described below, to obtain a heated powder material for producing a three-dimensional object.

Heating temperature: 450 degrees C.
Heating time: 2 hours
Heating environment: in a vacuum of 10$^{-2}$ Pa or lower
Temperature elevating rate: 200 degrees C./h The amount W of carbon remaining in the heated powder material for producing a three-dimensional object obtained is measured under the conditions described below, using a carbon analyzer (EMIA-STEP) available from HORIBA, Ltd.

Purging time: 0 seconds, integration waiting time: 5 seconds, and integration time: 60 seconds
Comparator level: 1.0%, comparator waiting time: 15 seconds
Set temperature: 1,350 degrees C., time: 1,500 seconds,
Sample weight: 0.1 g
Combustion improver: tin (0.5 g)

When Ti is used as the base material, pure iron (0.5 g), tungsten (1.5 g), and tin (0.3 g) are used as the combustion improver.

A three-dimensional object produced using the powder material for producing a three-dimensional object satisfying the formula described above has a constant resin content per certain volume. Because the resin content is constant, the amount W (mass %) of remaining carbon per mass of the three-dimensional object varies depending on the specific gravity of the base material (metal).

The present inventors sintered a powder material for producing a three-dimensional object, of which amount W (mass %) of remaining carbon measured by the measuring method described above was 0.34 mass % or higher, and as a result, found that the powder material did not undergo sintering and failed to produce a three-dimensional object having a high sintered density. The formula described above is a formula for deriving a powder material for producing a three-dimensional object of which amount of remaining carbon measured by the measuring method described above is lower than 0.34 mass %.

The present inventors found that among sintering-resistant materials serving as the base material such as aluminum (Al), titanium (Ti), and copper (Cu), aluminum is particularly sintering-resistant, and that the cause of the sintering resistance of aluminum is the amount W (mass %) of remaining carbon. This is considered clue to that the remaining carbon inhibits mutual contact of aluminum particles in the sintering step to cause a sintering failure. The formula described above is a formula based on the case where sintering-resistant aluminum is used as the base material.

—Base Material—

The base material is not particularly limited and may be appropriately selected depending on the intended purpose so long as the base material has a form of a powder or particles. Preferable examples of the material of the base material include metals and ceramics.

The metals are not particularly limited so long as metals are contained as constituents. Examples of the metals include sintering-resistant materials such as aluminum (Ai), titanium (Ti), and copper (Cu), magnesium (Mg), vanadium (V), chromium (Cr), manganese (Mn), iron (Fe), cobalt (Co), nickel (Ni), zinc (Zn), yttrium (Y), zirconium (Zr), niobium (Nb), molybdenum (Mo), lead (Pd), silver (Ag), indium (In), tin (Sn), tantalum (Ta), tungsten (W), and neodymium (Nd), and alloys of these metals. Among these metals, stainless (SUS) steel, iron (Fe), copper (Cu), silver (Ag), titanium (Ti), and aluminum (Al), or alloys of these metals are preferable. Sintering-resistant materials such as aluminum (Al), titanium (Ti), and copper, or alloys of these sintering-resistant materials are more preferable. Examples of aluminum alloys include AlSi10Mg, AlSi12, AlSi7Mg0.6, AlSi3Mg, AlSi9Cu3, Scalmalloy, and ADC12.

One of these metals may be used alone or two or more of these metals may be used in combination.

Examples of the ceramics include oxides, carbides, nitrides, and hydroxides.

Examples of the oxides include metal oxides. Examples of the metal oxides include silica ($SiO_2$), alumina ($Al_2O_3$), zirconia ($ZrO_2$), and titania ($TiO_2$). These ceramic materials are mere examples, and the ceramics are not limited to these ceramic materials. One of these ceramic materials may be used alone or two or more of these ceramic materials may be used in combination.

A commercially available product can be used as the base material. Examples of the commercially available product include: PURE AL (available from Toyo Aluminium K.K., A1070-30BB); PURE TI (available from OSAKA Titanium Technologies Co., Ltd.); SUS316L (available from Sanyo Special Steel Co., Ltd., product name: PSS316L); and AlSi10Mg (available from Toyo Aluminium K.K., Si10Mg30BB); $SiO_2$ (available from Tokuyama Corporation, product name: EXCELLICA SE-15K), $AlO_2$ (available from Taimei Chemicals Co., Ltd., product name: TAIMICRON TM-5D), and $ZrO_2$ (available from Tosoh Corporation, product name: TZ-B53).

A known surface treatment (surface reforming treatment) may be applied to the base material for improvement of adhesiveness with resins and improvement of coatability.

The volume average particle diameter of the base material is not particularly limited and may be appropriately selected depending on the intended purpose. For example, the volume average particle diameter of the base material is preferably 2 micrometers or greater but 80 micrometers or less and more preferably 8 micrometers or greater but 50 micrometers or less.

When the volume average particle diameter of the base material is 2 micrometers or greater, increase in the influence of aggregation of the base material can be prevented and the base material can be easily coated with resins, making it possible to prevent a yield drop, an object productivity drop, and degradation of treatability and handleability of the base material. When the volume average particle diameter of the base material is 80 micrometers or less, the filling ratio at which a thin layer, which is formed of the powder material for producing a three-dimensional object, is filled with the powder material for producing a three-dimensional object is improved, making, for example, voids less likely to be generated in a three-dimensional object to be obtained.

The particle size distribution of the base material is not particularly limited and may be appropriately selected depending on the intended purpose. A sharper particle size distribution is preferable.

The content of the base material having a volume average particle diameter of 10 micrometers or less relative to the total amount of the base material is preferably 1.5% or greater. When the content of the base material having a volume average particle diameter of 10 micrometers or less relative to the total amount of the base material is 1.5% or greater, the filling ratio at which a layer of the powder material is filled with the powder material for producing a three-dimensional object is improved. For example, this makes voids less likely to be generated in a three-dimensional object to be obtained. Among base materials, the highly active metals (e.g., aluminum and titanium) have an extremely high dust explosibility and cannot be used for three-dimensional object production when these materials are particles having a particle diameter of 10 micrometers or less. However, because the resin of the present disclosure significantly reduces dust explosibility, it is possible to use powder materials formed of the highly active metals. The ability to use a powder of a low particle diameter leads to reduction of surface roughness of the surface and improvement of a sintered body density.

The volume average particle diameter and the particle size distribution of the base material can be measured using a known particle diameter measuring instrument. Examples of the particle diameter distribution measuring instrument include MICROTRAC MT3000II series (available from Microtrac Bel).

For example, the contour, surface area, circularity, fluidity, and wettability of the base material may be appropriately selected depending on the intended purpose.

The base material can be produced using a known method. Examples of the method for producing a base material of a powder or particulate form include a crushing method of applying, for example, compression, impacts, or friction to a solid to break the solid into pieces, an atomizing method of atomizing a molten metal to obtain a rapidly cooled powder, a precipitation method of precipitating a component dissolved in a liquid, and a gas phase reaction method of vaporizing and crystallizing a material.

The method for producing the base material is not limited, but a preferred method is the atomizing method because a spherical shape can be obtained and there is little variation in the particle diameter. Examples of the atomizing method include a water atomizing method, a gas atomizing method, a centrifugal atomizing method, and a plasma atomizing method. All of these methods are suitably used.

—Resin—

The resin preferably contains a nonaqueous first resin and further contains other components as needed. It is preferable that the powder material for producing a three-dimensional object of the present disclosure contain a coating film formed of the resin and coating the surface of the base material.

The composition of the resin may be the same as or different from the composition of the resin particles described below.

The resin needs at least to have solubility in a hardening liquid and hardenability by a hardening agent contained in the hardening liquid. The powder material for producing a three-dimensional object containing the resin can be a powder material for producing a three-dimensional object preventive against occurrence of, for example, dust explosion and excellent in safety.

In the present disclosure, for example, the solubility of the resin refers to a solubility of 3% by mass or greater when the nonaqueous first resin (1 g) is mixed and stirred in a solvent (100 g) constituting the hardening liquid at 50 degrees C.

The nonaqueous first resin that enables the powder material for producing a three-dimensional object to have an amount (mass %) of remaining carbon satisfying the formula described above can be selected by a selecting method described below. For example, a resin that has a weight reduction ratio of 97% or higher at 400 degrees C. and has no remaining carbon at 550 degrees C. when heated in TG-DTA under a $N_2$ gas flow (200 mL/min) at a temperature elevating rate of 10 degrees C./min can be selected as the nonaqueous first resin that is preferable.

The nonaqueous first resin has a low reactivity to the metals (highly active metals) having a high activity as the base material, water, and powders. The resin before application of a hardening liquid is soluble in organic solvents (first and second organic solvents described below). The resin after application of a hardening liquid (after hardening) is insoluble in the organic solvents. Particularly, it is preferable that the resin have a low solubility in water and have solubility in organic solvents.

With the resin forming a coating film that coats the surface of the base material, it is possible to suppress dust explosion that occurs when the particles of the base material have a small size. Moreover, with the coating film, operations can be performed in the atmosphere.

When the coating film has a low reactivity to the powders of metals (highly active metals) having a high activity as the base material, the coating film before application of a hardening liquid is soluble in the organic solvents, and the coating film after application of a hardening liquid (after hardening) is insoluble in the organic solvents, water-prohibited materials such as highly active metals can be used as the base material, and a three-dimensional object produced can be prevented from being disintegrated when dipped in a solvent-based solution. That is, the base material having the coating film on the surface can be suppressed from, for example, unintentional degeneration of the base material surface and gas emission.

The nonaqueous first resin is not particularly limited so long as the nonaqueous first resin has a water solubility of 0.5 (g/100 g-H2O) or less (i.e., soluble by 0.5 g or less in water (100 g) at 25 degrees C.). Examples of the nonaqueous first resin include acrylic, acrylic polyol, polyester, epoxy, polyol, urethane, polyether, polyvinyl butyral, polyvinyl acetal, polyvinyl chloride, vinyl acetate, paraffin/olefin series, and ethyl cellulose. Moreover, the nonaqueous first resin is not particularly limited so long as the nonaqueous first resin has solubility in the hardening liquid. The nonaqueous first resin may be a homopolymer, a heteropolymer (copolymer), modified, or have a known functional group introduced. One of these resins may be used alone or two or more of these resins may be used in combination. When the resin is soluble in organic solvents, it is possible to ensure suppression of dust explosion and object production quality.

The weight average molecular weight of the nonaqueous first resin is preferably 150,000 or less, and more preferably 20,000 or greater but 100,000 or less. The nonaqueous first resin is preferably a normal-temperature solid having a weight average molecular weight of 100,000 or less.

A commercially available product may be used as the nonaqueous first resin. Examples of the commercially available product include polyvinyl butyral (available from Sekisui Chemical Co., Ltd., BM-5), a copolymer of vinyl acetate and vinyl chloride (available from Nissin Chemical Co., Ltd., SOLVAIN A), polyacrylic polyol (available from DIC Corporation, e.g., ACRYDIC WFU-580), polyester polyol (e.g., POLYLITE OD-X-688 available from DIC Corporation, and e.g. ADEKA NEWACE YG-108 available from ADEKA Corporation), polybutadiene polyol (available from Nippon Soda Co., Ltd., e.g., GQ-1000), polyvinyl butyral and polyvinyl acetal (e.g., ESLEC BM-2 and KS-1 available from Sekisui Chemical Industry Co., Ltd., and e.g., MOVITAL B20H available from Kuraray Co., Ltd.), acrylic polyol (available from Toeikasei Co., Ltd., TZ9515), and ethyl cellulose (available from Nissin-Kasei Co., Ltd., ETHOCEL).

The average thickness of the coating film is preferably 10 nm or greater but 800 nm or less and more preferably 100 nm or greater but 600 nm or less. When the average thickness of the coating film is 10 nm or greater, dust explosibility of the powder material for producing a three-dimensional object can be suppressed. The coating film functions as a binder component because the coating film dissolves in a hardening liquid described below to cause the particles of the powder material to mutually adhere. Therefore, there is no need for adding a binder component in the hardening liquid, and clogging of a nozzle head can be suppressed. As a result, a high-quality three-dimensional object without a production deficiency can be produced.

Moreover, with adjustment of the coating film thickness, it is possible to control wettability/spreadability during contact with an organic solvent-based ink, making it possible to produce an object with a high resolution. The average thickness as the coating film thickness of 10 nm or greater is effective in terms of dust explosion. When the average thickness is 800 nm or less, a hardened product (three-dimensional object) formed of (layers) of the powder material for producing a three-dimensional object produced by applying the organic solvent-based ink to the powder material for producing a three-dimensional object has an improved dimensional accuracy. When the average thickness is greater than 800 nm, the ratio of the base material in an object may be reduced, or layers cannot be filled with the powder material at a high density during lamination of the powder material. As a result, only a sintered body having a low density will be obtained.

The average thickness can be measured with, for example, a scanning tunneling microscope STM, an atomic force microscope AFM, or a scanning electron microscope SEM, after, for example, embedding the powder material for producing a three-dimensional object in, for example, an acrylic resin and exposing the surface of the base material by, for example, etching.

The ratio at which the nonaqueous first resin coats the surface of the base material with respect to the surface area of the base material, i.e., the surface coating ratio at which the coating film coats the base material is not particularly limited so long as the effect of the present disclosure can be obtained, and for example, is preferably 15% or higher, more preferably 50% or higher, and particularly preferably 80% or higher. The coating state of the resin over the surface of the base material may be a continuous film or a discontinuous film when the surface coating ratio is not 100%.

When the coating ratio is 15% or higher, the effect of suppressing dust explosibility is high even for highly active metals. For example, an image of the powder material for producing a three-dimensional object may be observed, and an average of the area ratio (%) of the portions coated with the organic material to the area of the whole surface of a particle of the powder material may be calculated as the coating ratio based on the powder material for producing a three-dimensional object captured in the two-dimensional image. Alternatively, element mapping of the portions coated with the organic material may be performed by energy dispersive X-ray spectroscopy such as SEM-EDS.

—Resin Particles—

The resin particles preferably contain a second resin and further contain other components as needed. It is preferable that the powder material for producing a three-dimensional object of the present disclosure contain the resin particles over the coating film.

It is preferable that the resin particles dissolve in the hardening liquid by greater than or equal to ¼ of the diameter of the resin particles.

The volume average particle diameter of the resin particles is preferably 600 nm or less and more preferably 200 nm or less.

When the volume average particle diameter of the resin particles is 600 nm or less, the adhesive force between powder particles can be significantly reduced owing to the spacer effect, and fluidity of the powder material can be significantly improved. Therefore, a uniform, high-density powder bed can be formed, making it possible to significantly improve uniformity, density, accuracy, and hardness of a three-dimensional object (green body) to be produced. Hence, when the three-dimensional object produced is carried in a hand or blown with air to remove any excessive powder material, the three-dimensional object will not collapse and can be subjected to post-processing. Moreover, the uniform, high-density powder bed has a uniform ink permeability, making it possible to form a uniform three-dimensional object having a good hardness and a good accuracy. Because the base material is present at a high density in the three-dimensional object obtained and the resin surrounding the base material is present in a low amount, a compact (sintered body) obtained by subjecting the three-dimensional object to, for example, sintering contains few unnecessary voids and has a beautiful appearance.

When the volume average particle diameter of the resin particles is 200 nm or less, the spacer effect acts more effectively for the powder material for producing a three-dimensional object having a small particle diameter of 10 micrometers or less, leading to a high effect of improving fluidity. Therefore, it is possible to use a base material with a smaller particle diameter, making it possible to improve sinterability and overcome surface roughness of an object.

When the resin particles have a volume average particle diameter of greater than 600 nm, the resin particles are close to the size of the base material of the powder material for producing a three-dimensional object having a particle diameter of 10 micrometers or less, leading to degradation of the spacer effect and degradation of fluidity. Moreover, during sintering, the particles have a greater particle-particle distance and a liquid phase cannot join adjacent particles, leading to occurrence of pores in the three-dimensional object, density degradation of the three-dimensional object, and sintering failure.

The coating ratio of the resin particles over the surface of the base material having the coating film is preferably 3% or higher. When the coating ratio of the resin particles is lower than 3%, the spacer effect cannot be sufficiently exerted and fluidity is worsened. This may considerably degrade the object production quality.

The volume average particle diameter and the coating ratio of the resin particles can be calculated by, for example, observing an image of the powder material for producing a three-dimensional object and measuring the average size of a hundred resin particles present on the powder material particles based on the powder material for producing a three-dimensional object captured in the two-dimensional image. As for the coating ratio of the resin particles, the area ratio (%) of the resin particle material to the area of the whole surface of a powder material particle may be calculated and measured as the coating ratio.

The second resin is not particularly limited and may be appropriately selected depending on the intended purpose. Preferable examples of the second resin include acrylic, styrene, and amino. Among these resins, acrylic is preferable. One of these resins may be used alone or two or more of these resins may be used in combination.

Examples of the amino include benzoguanamine.

The second resin that enables the powder material for producing a three-dimensional object to have an amount (mass %) of remaining carbon satisfying the formula described above can be selected by the same method as the first resin selecting method.

—Other Components—

The other components are not particularly limited and may be appropriately selected depending on the intended purpose. Examples of the other components include a fluidizer, a filler, a leveling agent, and a sintering aid.

The fluidizer is preferable because, for example, a layer of the powder material for producing a three-dimensional object can be formed easily and efficiently.

The filler is an effective material mainly for being made to adhere to the surface of the powder material for producing a three-dimensional object or to fill the voids between the powder material particles. The filler has effects of improving fluidity of the powder material for producing a three-dimensional object, increasing the number of contact points between the particles of the powder material for producing a three-dimensional object and reducing voids, and consequently improving the strength and dimensional accuracy of a three-dimensional object.

The leveling agent is an effective material mainly for controlling the wettability of the surface of the powder material for producing a three-dimensional object. The leveling agent has effects of enhancing permeability of a liquid for producing an object into a powder layer, increasing the strength of an object and the speed of object production, and maintaining the shape of the object stably.

The sintering aid is an effective material for enhancing the sintering efficiency during sintering of an object obtained. For example, the sintering aid has effects of improving the strength of an object, making an object sinterable at a low sintering temperature, and saving the time taken for sintering.

—Method for Producing Powder Material for Producing Three-Dimensional Object—

The method for producing the powder material for producing a three-dimensional object is not particularly limited and may be appropriately selected depending on the intended purpose. For example, a method of coating the base material with the resins according to a known coating method is preferable.

The method for coating the surface of the base material with the resins is not particularly limited and can be appropriately employed from known coating methods. Examples of the coating methods include a roll fluidized bed coating method, a spray dry method, a stirring mixing adding method, a dipping method, and a kneader coating method. These coating methods can be performed using various known, commercially-available coating machines and granulators.

—Physical Properties of Powder Material for Producing Three-Dimensional Object—

The volume average particle diameter of the powder material for producing a three-dimensional object is not particularly limited, may be appropriately selected depending on the intended purpose, and is preferably 2 micrometers or greater but 80 micrometers or less. When the volume average particle diameter of the powder material for producing a three-dimensional object is 2 micrometers or greater, the powder material has an improved fluidity that makes it easier to form a powder material layer, and laminated layers have an improved layer surface smoothness. Hence, the productivity of a three-dimensional object, treatability and handleability of a three-dimensional object, and dimensional accuracy of a three-dimensional object tend to improve. When the volume average particle diameter of the powder material for producing a three-dimensional object is 80 micrometers or less, the particles of the powder material have a small space between the particles, leading to a low voidage of a three-dimensional object and improvement of the strength of a three-dimensional object. A volume average particle diameter of 2 micrometers or greater but 80 micrometers or less is suitable for satisfying both of dimensional accuracy and strength.

The particle size distribution of the powder material for producing a three-dimensional object is not particularly limited and may be appropriately selected depending on the intended purpose.

The angle of repose as a property of the powder material for producing a three-dimensional object is preferably 60 degrees or less, more preferably 50 degrees or less, and yet more preferably 40 degrees or less.

When the angle of repose of the powder material for producing a three-dimensional object is 60 degrees or less, the powder material for producing a three-dimensional object can be efficiently and stably disposed at a desired position over a support.

The angle of repose can be measured using, for example, a powder characteristic measuring instrument (POWDER TESTER PT-N TYPE, available from Hosokawa Micron Corporation).

The powder material for producing a three-dimensional object of the present disclosure can be suitably used for simple, efficient production of various compacts and structures, and can be particularly suitably used with a kit for producing a three-dimensional object of the present disclosure, the hardening liquid, a three-dimensional object producing method of the present disclosure, and a three-dimensional object producing apparatus of the present disclosure described below.

By simply applying the hardening liquid to the powder material for producing a three-dimensional object of the present disclosure, it is possible to easily, efficiently produce a structure having a complicated three-dimensional shape with a good dimensional accuracy. The structure obtained in this way is a hardened product (three-dimensional object) having a sufficient hardness, will not undergo shape collapse even when carried in a hand, taken in or out from a mold, or blown with air to remove any excessive powder material for producing a three-dimensional object, and has an excellent treatability and an excellent handleability. The hardened product may be used as it is, or as a hardened product for sintering, may further be sintered to a compact (or a sintered body of a three-dimensional object). When the hardened product is sintered, the compact obtained through the sintering will not include, for example unnecessary voids. Therefore, a compact having a beautiful appearance is easily obtained.

(Three-Dimensional Object Producing Method and Three-Dimensional Object Producing Apparatus)

A three-dimensional object producing method of the present disclosure includes a powder material layer forming step of forming a powder material layer using the powder material for producing a three-dimensional object of the present disclosure, and a hardened product forming step of applying a hardening liquid to the powder material layer to form a hardened product, and as needed, further includes other steps such as an excessive powder removing step and a sintering step.

The three-dimensional object producing method is characterized by repeating the powder material layer forming step and the hardened product forming step to produce a three-dimensional object.

A three-dimensional object producing apparatus of the preset disclosure includes a powder material layer forming unit and a hardened product forming unit, and as needed, further includes other units such as an excessive powder removing unit and a sintering unit.

The present investors have studied the following problems of existing techniques and obtained the finding described below.

Inkjet supply of the adhesive material has problems that the nozzle head used may be clogged, there are limitations to the selection of adhesive materials that can be used, and efficiency is not ensured with cost consumability.

Existing techniques have a problem that an adhesive liquid produced when adhesive particles dissolve in a binder material applied tends not to spread uniformly between powder particles, making it difficult to provide a three-dimensional object with a sufficient strength and a sufficient accuracy.

Moreover, according to existing techniques, limonene, which has a low volatility and tends to be kept remaining in a three-dimensional object, may degrade the strength of the three-dimensional object. Lowly volatile solvents such as toluene are problematic in terms of safety. Moreover, there is a problem that a coating resin alone is not sufficient for providing a three-dimensional object with accuracy due to insufficient fluidity and may degrade the density of the base material in a three-dimensional object.

Another problem of existing techniques is that the techniques cannot be employed when a resin coating a base material or a hardening liquid contains water and the base material used has a high reactivity with water. Existing techniques also have the following problem. Cross-linking agents are organometallic salts that form chelate complexes as cross-linked structures. This means that the cross-linking reaction is reversible and the water resisting effect is low, and hence that a remover liquid dipping method for processing excessive powder particles of a plurality of objects collectively cannot be employed. Moreover, a metal chelate complex has a problem that a metal component more or less remains in a sintered body, or that sintering inhibition may occur depending on the kind of the metal.

Furthermore, object production by laser light irradiation using aluminum or titanium, which is a highly active metal, needs to be performed in an inert atmosphere due to the high reactivity of the material. Moreover, aluminum or titanium powders have a risk of causing dust explosion easily even by static electricity, and there is a need for preparing dedicated equipment that can be purged with an inert gas when handling metal powders in order to suppress dust explosion.

Hence, binder jetting methods that are typically carried out in the atmosphere cannot handle powders of highly active metals, because use of such powder for object production has a risk of dust explosion.

Moreover, it hitherto has been difficult to sinter Al clue to oxidation coating, and presence of even a small amount of such a foreign material makes a difference in how a liquid phase exudes, making it difficult to provide an object with a high density while maintaining the shape of the object. Particularly, remaining carbon of a binder component inhibits mutual interfacial binding of powder particles, making it difficult to increase sintered density.

According to the three-dimensional object producing method of the present disclosure, it has been found possible to obtain a three-dimensional object excellent in high sintered density and dimensional accuracy, using a powder material for producing a three-dimensional object containing the base material, the resin, and the resin particles and having an amount W (mass %) of remaining carbon satisfying the following formula: W (mass %)<0.9/M (where M represents the specific gravity of the base material) after heating in a vacuum of $10^{-2}$ Pa or lower at 450 degrees C. for 2 hours.

—Powder Material Layer Forming Step and Powder Material Layer Forming Unit—

The powder material layer forming step is a step of forming a powder material layer using a powder material for producing a three-dimensional object containing: a base material; a resin; and resin particles, wherein an amount W (mass %) of carbon remaining in the powder material after heating in a vacuum of $10^{-2}$ Pa or lower at 450 degrees C. for 2 hours satisfies the following formula: W (mass %)<0.9/M where M represents the specific gravity of the base material.

The powder material layer forming unit is a unit configured to form a powder material layer using a powder material for producing a three-dimensional object containing: a base material; a resin; and resin particles, wherein an amount W (mass %) of carbon remaining in the powder material after heating in a vacuum of $10^{-2}$ Pa or lower at 450 degrees C. for 2 hours satisfies the following formula: W (mass %)<0.9/M where M represents the specific gravity of the base material.

—Support—

The support is not particularly limited and may be appropriately selected depending on the intended purpose so long as the powder material for producing a three-dimensional object can be placed over the support. Examples of the support include a table having a placing surface over which the powder material for producing a three-dimensional object is placed, and a base plate of the device described in FIG. 1 of Japanese Unexamined Patent Application Publication No. 2000-328106.

The surface of the support, i.e., the placing surface over which the powder material for producing a three-dimensional object is placed may be, for example, a smooth surface or a rough surface, or a planar surface or a curved surface. It is preferable that the placing surface have a low affinity with the resins of the powder material for producing a three-dimensional object when the resins are dissolved and hardened by the hardening agent.

It is preferable that the affinity of the placing surface with the resins dissolved and hardened be lower than the affinity of the base material with the resins dissolved and hardened, because this makes it easy to remove an obtained three-dimensional object from the placing surface.

—Formation of Powder Material Layer—

The method for placing the powder material for producing a three-dimensional object over the support to form a powder material layer is not particularly limited and may be appropriately selected depending on the intended purpose. Preferable examples of a method for placing the powder material for producing a three-dimensional object in the form of a thin layer include a method of using, for example, a known counter rolling mechanism (counter roller), used in the selective laser sintering method described in Japanese Patent No. 3607300, a method of spreading the powder material for producing a three-dimensional object into the form of a thin layer using such a member as a brush, a roller, or a blade, a method of spreading the powder material for producing a three-dimensional object into the form of a thin layer using a press member to press the surface of the powder material for producing a three-dimensional object, and a method of using a known powder additive manufacturing apparatus.

Placing the powder material for producing a three-dimensional object over the support in the form of a thin layer using, for example, the counter rolling mechanism (counter roller), the brush, roller, or blade, or the press member as the powder material layer forming unit may be performed in the following manner.

That is, using, for example, the counter rolling mechanism (counter roller), the brush, roller, or blade, or the press member, the powder material for producing a three-dimensional object is placed over the support disposed within an outer fame (may also be referred to as "mold", "hollow cylinder", and "tubular structure") in a manner that the support can be lifted up and down while sliding on the internal wall of the outer frame. When the support used is a member that can be lifted up and down within the outer frame, the support may be disposed at a position slightly below the upper end opening of the outer frame, i.e., at a position below the upper end opening by the thickness of a layer of the powder material for producing a three-dimensional object, and then the powder material for producing a three-dimensional object may be placed over the support. In this way, the powder material for producing a three-dimensional object can be placed over the support in the form of a thin layer.

When the hardening liquid described below is caused to act on the powder material for producing a three-dimensional object placed in the form of a thin layer in the manner described above, the layer hardens (the hardened product forming step).

Then, when the powder material for producing a three-dimensional object is placed in the form of a thin layer in the same manner as described above over the hardened product of the thin layer obtained above and the hardening liquid is caused to act on (the layer) of the powder material for producing a three-dimensional object placed in the form of a thin layer, hardening occurs. This hardening occurs not only in (the layer) of the powder material for producing a three-dimensional object placed in the form of a thin layer but also between (the layer) of the powder material for producing a three-dimensional object and the underlying hardened product of the thin layer obtained by the previous hardening. As a result, a hardened product (three-dimensional object) having a thickness corresponding to about two layers of the powder material for producing a three-dimensional object placed in the form of a thin layer is obtained.

Alternatively, an automatic, quick manner using the known powder additive manufacturing apparatus may be employed to place the powder material for producing a three-dimensional object over the support in the form of a thin layer. Typically, the powder additive manufacturing apparatus includes a recoater configured to laminate layers of the powder material for producing a three-dimensional object, a movable supplying tank configured to supply the powder material for producing a three-dimensional object onto the support, and a movable forming tank in which the powder material for producing a three-dimensional object is placed in the form of a thin layer and laminated. In the powder additive manufacturing apparatus, it is possible to constantly dispose the surface of the supplying tank slightly above the surface of the forming tank by lifting up the supplying tank, by lifting down the forming tank, or by both, it is possible to place the powder material for producing a three-dimensional object in the form of a thin layer by actuating the recoater from the supplying tank side, and it is possible to laminate thin layers of the powder material for producing a three-dimensional object by repeatedly moving the recoater.

The thickness of a layer of the powder material for producing a three-dimensional object is not particularly limited and may be appropriately selected depending on the intended purpose. For example, the average thickness per layer is preferably 30 micrometers or greater but 500 micrometers or less and more preferably 60 micrometers or greater but 300 micrometers or less.

When the thickness is 30 micrometers or greater, a hardened product (three-dimensional object) of (a layer) of the powder material for producing a three-dimensional object, formed by applying the hardening liquid to the powder material for producing a three-dimensional object, has a sufficient strength, and does not cause problems such as shape collapse during post-treatment such as sintering or post-handling. When the thickness is 500 micrometers or less, a hardened product (three-dimensional object) of (a layer) of the powder material for producing a three-dimensional object, formed by applying the hardening liquid to the powder material for producing a three-dimensional object, has an improved dimensional accuracy.

The average thickness may be measured by any method that is not particularly limited and can be measured by a known method.

—Hardened Product Forming Step and Hardened Product Forming Unit—

The hardened product forming step is a step of applying a hardening liquid to the powder material layer to form a hardened product.

The hardened product forming unit is a unit configured to apply a hardening liquid to the powder material layer to form a hardened product.

—Hardening Liquid—

The hardening liquid contains a hardening agent, and contains a first organic solvent, and as needed, other components.

—Hardening Agent—

The hardening agent can form a covalent bond with a reactive functional group. The hardening agent forms a covalent bond with a reactive functional group of the resins to form a cross-linked structure, making it possible to better enhance the strength of a three-dimensional object to be obtained and improve solvent resistance. In the present disclosure, "hardening agent" is the same as "cross-linking agent".

The hardening agent preferably contains two or more of at least one selected from isocyanates, acid anhydrides, and epoxies in a molecule thereof or at an end of a molecule thereof.

Examples of the isocyanates include diisocyanates and polyisocyanates.

Examples of the diisocyanates include: aromatic or aromatic-series-derived polyisocyanates such as tolylene diisocyanate (TDI), diphenylmethane diisocyanate (MDI), polymeric MDI (MDI), tolidine diisocyanate (TODD, naphthalene diisocyanate (NDI), xylylene diisocyanate (XDI), and paraphenylene diisocyanate; aliphatic isocyanates such as isophorone diisocyanate (IPDI), and hexamethylene diisocyanate (HMDI); and others such as lysine diisocyanate (LDI) and tetramethylxylene diisocyanate (TMXDI).

Examples of the polyisocyanates include adduct forms, isocyanurate forms, and allophanate forms of the diisocyanates.

Examples of the acid anhydrides include acid dianhydrides.

Examples of the acid dianhydrides include pyromellitic anhydride,
3,4'-oxydiphthalic anhydride, 4,4'-oxydiphthalic anhydride,
4,4-carbonyldiphthalic anhydride,
bicyclo[2.2.2]oct-7-ene-2,3,5,6-tetracarboxylic dianhydride,
diphenyl-3,3',4,4'-tetracarboxylic dianhydride,
diphenyl-2,3,3',4'-tetracarboxylic dianhydride,
meso-butane-1,2,3,4-tetracarboxylic dianhydride,
1,2,3,4-cyclobutanetetracarboxylic dianhydride,
1,2,3,4-cyclopentanetetracarboxylic dianhydride,
1,2,4,5-cyclohexanetetracarboxylic dianhydride,
5-(2,5-dioxotetrahydrofuryl)-3-methyl-3-cyclohexene-1,2-dicarboxylic anhydride, 4-(2,5-dioxotetrahydrofuran-3-yl)-tetralin-1,2-dicarboxylic anhydride, 5,5'-(ethyne-1,2-diyl)bis(isobenzofuran-1,3-dione),
5,5'-(9H-fluorene-9,9-diyl)bis(2-benzofuran-1,3-dione),
naphthalene-1,4,5,8-tetracarboxylic dianhydride,
4,4'(4,4'-isopropylidenediphenoxy)bis(phthalic anhydride),
1,2,3,4-tetramethyl-1,2,3,4-cyclobutanetetracarboxylic dianhydride,
octahydrobiphenylene-4a,8b:4b,8a-tetracarboxylic dianhydride,
bis(1,3-dioxo-1,3-dihydroisobenzofuran-5-carboxylic acid) 1,4-phenylene,
3,4,9,10-perylenetetracarboxylic dianhydride,
4,4'-ethylenebis(2,6-morpholinedione), and
N,N-bis[2-(2,6-dioxomorpholino)ethyl]glycine.

Examples of the epoxies include epoxy resins.

One of these isocyanates, acid anhydrides, and epoxies may be used alone or two or more of these isocyanates, acid anhydrides, and epoxies may be used in combination.

The content of the hardening agent relative to the total amount of the hardening liquid is not particularly limited and may be appropriately selected depending on the intended purpose. The content of the hardening agent is preferably 1.0% by mass or greater but 50% by mass or less and more preferably 10% by mass or greater but 30% by mass or less. When the content of the hardening agent relative to the total amount of the hardening liquid is 1.0% by mass or greater but 50% by mass or less, it is possible to prevent strength insufficiency of a three-dimensional object to be obtained, prevent thickening or gelation of the hardening liquid, and prevent degradation of liquid storage stability and viscosity stability. Particularly, the content of the hardening agent relative to the total amount of the hardening liquid is preferably 1.0% by mass or greater but 50% by mass or less relative to 3 parts by mass of the resins in the powder material for producing a three-dimensional object.

—First Organic Solvent—

The first organic solvent is not particularly limited and may be appropriately selected depending on the intended purpose so long as the first organic solvent can dissolve the nonaqueous first resin. Examples of the first organic solvent include aliphatic compounds, aromatic compounds, ketones, esters, and sulfoxides.

Examples of the aliphatic compounds include alcohols and ethylene glycols.

Examples of the aromatic compounds include toluene and xylene.

Examples of the ketones include acetone and methyl ethyl ketone.

Examples of the esters include butyl acetate, ethyl acetate, propylene acetate, methyl acetate and diethyl succinate.

Examples of the sulfoxides include dimethyl sulfoxide.

The content of the first organic solvent relative to the total amount of the hardening liquid is preferably 30% by mass or greater but 90% by mass or less and more preferably 50% by mass or greater but 80% by mass or less. When the content of the first organic solvent relative to the total amount of the hardening liquid is 30% by mass or greater but 90% by mass or less, it is possible to improve solubility of the resins and improve the strength of a three-dimensional object. It is also possible to prevent drying of nozzles during a non-operating time (waiting time) of the apparatus and suppress liquid clogging or non-discharging nozzles.

—Other Components—

The other components may be appropriately selected in consideration of various conditions such as the type of the unit configured to apply the hardening liquid, and frequency and amount of use. For example, when applying the hardening liquid by an inkjet method, the other components may be selected in consideration of the influences of, for example, clogging of a nozzle head of, for example, an inkjet printer. Examples of the other components include a preservative, an antiseptic, a stabilizer, and a pH adjustor.

The method for preparing the hardening liquid is not particularly limited and may be appropriately selected depending on the intended purpose. Examples of the method include a method of adding, mixing, and dissolving the other components in the organic solvent as needed. In order to impart a binder component, it is possible to dissolve the resin component of the coating film. Examples of the binder component include acrylic, acrylic polyol, polyester, epoxy, polyol, urethane, polyether, polyvinyl butyral, polyvinyl acetal, polyvinyl chloride, vinyl acetate, paraffin/olefin, and ethyl cellulose.

The method for applying the hardening liquid to the powder material layer is not particularly limited and may be appropriately selected depending on the intended purpose. Examples of the method include a dispenser method, a spray method, and an inkjet method. In order to perform these methods, a known apparatus can be suitably used as the hardened product forming unit.

Among these methods, the dispenser method has excellent liquid droplet quantitativity, but has a small coating coverage. The spray method can form a minute jet of the materials easily and has a wide coating coverage and excellent coatability, but has a poor liquid droplet quantitativity and causes the powder material to scatter due to a spray current. Hence, in the present disclosure, the inkjet method is particularly preferable. The inkjet method is preferable because the inkjet method is better than the spray method in liquid droplet quantitativity, can obtain a greater coating coverage than can be obtained by the dispenser method, and can form a complicated three-dimensional shape with a good accuracy efficiently.

In the case of the inkjet method, the hardened product forming unit includes nozzles capable of applying the hardening liquid to the powder material layer by the inkjet method. Nozzles (discharging heads) of a known inkjet printer can be suitably used as the nozzles, and the inkjet printer can be suitably used as the hardened product forming unit. Preferable examples of the inkjet printer include SG7100 available from Ricoh Company, Ltd. The inkjet printer is preferable because the inkjet printer can realize rapid coating owing to the capability of dropping the hardening liquid from a head in a large amount at a time and covering a large area.

In the present disclosure, use of the inkjet printer capable of applying the hardening liquid accurately and highly efficiently is advantageous to the hardening liquid because the hardening liquid, which is free of solid matters such as particles and polymeric high-viscosity materials such as resins, will not, for example, clog or corrode the nozzles or the nozzle heads of the inkjet printer, can efficiently permeate the organic materials of the powder material for producing a three-dimensional object when applied (discharged) to a layer of the powder material for producing a three-dimensional object, ensuring an excellent productivity of a three-dimensional object, and will deliver no polymeric components such as resins and hence cause, for example, no unexpected volume increase, ensuring that a hardened product having a good dimensional accuracy can be obtained easily, in a short time, and efficiently.

The hardening agent can also function as a pH adjuster in the hardening liquid. When applying the hardening liquid to a layer of the powder material for producing a three-dimensional object by the inkjet method, the pH of the hardening liquid is preferably from 5 (weakly acidic) through 12 (basic), and more preferably from 8 through 10 (weakly basic) in terms of preventing corroding or clogging of the nozzle heads of the nozzles used. A known pH adjuster may be used for adjustment of the pH.

—Powder Material Storage—

A powder material storage is a unit having stored the powder material for producing a three-dimensional object. For example, the size, shape, and material of the powder material storage are not particularly limited and may be appropriately selected depending on the intended purpose. Examples of the powder material storage include a storing tank, a bag, a cartridge, and a tank.

—Hardening Liquid Storage—

A hardening liquid storage is a unit having stored the hardening liquid. For example, the size, shape, and material of the hardening liquid storage are not particularly limited and may be appropriately selected depending on the intended purpose. Examples of the hardening liquid storage include a storing tank, a bag, a cartridge, and a tank.

—Other Steps and Other Units—

Examples of the other steps include an excessive powder removing step, a drying step, a sintering step, a surface protection treatment step, and a painting step.

Examples of the other units include an excessive powder removing unit, a drying unit, a sintering unit, a surface protection treatment unit, and a painting unit.

The excessive powder removing step is a step of removing any unhardened powder material for producing a three-dimensional object using a second organic solvent after the hardened product forming step.

The three-dimensional object is in a state of being buried in a non-object forming region (unhardened powder material for producing a three-dimensional object) to which the hardening liquid has not been applied. When the three-dimensional object is released from the buried state, the three-dimensional object comes with excessive (unhardened) powder material for producing a three-dimensional object adhering to the surface of the three-dimensional object or to an internal space of the structure. It is difficult to remove such excessive (unhardened) powder material for producing a three-dimensional object. This is even more difficult when the three-dimensional object has a complicated bossed-recessed profile on the surface or has a flow path-like internal structure. A pre-sintering precursor (i.e., the same as the three-dimensional object) obtained by a typical binder jetting method does not have a high strength. Therefore, the pre-sintering precursor may collapse when blown with air at a high pressure (0.4 MPa or higher).

A three-dimensional object produced using the powder material for producing a three-dimensional object and the hardening liquid of the present disclosure is packed with the powder at a high density highly reliably because the resin particles can impart a high fluidity to the powder. Hence, the resins are uniformly dissolved when the hardening liquid is dropped, and a strength enough to endure the pressure of air blowing is achieved. Moreover, the resins coating the base material are also better dissolved and solidified by the hardening agent contained in the hardening liquid, and a strength enough to endure the pressure of air blowing is achieved.

The strength of the pre-sintering precursor, expressed by three-point bending stress, is preferably 3 MPa or higher and more preferably 5 MPa or higher.

Not only is it possible to improve the strength, but also to easily remove any excessive powder adhering to the surface or to the internal structure by dipping in a remover liquid, because the coating resins hardened have become no longer soluble in the first and second organic solvents that can dissolve the resins coating the base material, whereas the unhardened resins coating the excessive powder dissolve in the second organic solvent.

Examples of the second organic solvent include ethanol, methanol, cyclohexane, methyl ethyl ketone, ethyl acetate, ethyl lactate, tetrahydrofuran, diethyl ether, and toluene.

The drying step is a step of drying the hardened product (three-dimensional object) obtained in the hardened product forming step. In the drying step, not only the water content in the hardened product but is also any organic components may be removed (degreased). Examples of the drying unit include known dryers.

The sintering step is a step of sintering the hardened product (three-dimensional object) formed in the hardened product forming step. Through the sintering step, the hardened product can be transformed into a densified, integrated metal or ceramic compact (i.e., a sintered body of the three-dimensional object). Examples of the sintering unit include a known sintering furnace.

The surface protection treatment step is a step of, for example, forming a protective layer over the hardened product (three-dimensional object) formed in the hardened product forming step. Through the surface protection treatment step, the surface of the hardened product (three-dimensional object) can be provided with, for example, durability that enables the hardened product (three-dimensional object) to be subjected to, for example, use as it is. Specific examples of the protective layer include a water-resistant layer, a weatherable layer, a light-resistant layer, a thermal insulating layer, and a gloss layer. Examples of the surface protection treatment unit include known surface protection treatment apparatuses such as a spray machine and a coating machine.

The painting step is a step of painting the hardened product (three-dimensional object) formed in the hardened product forming step. Through the painting step, the hardened product (three-dimensional object) can be colored in a desired color. Examples of the painting unit include known painting machines such as coating machines using, for example, spray, a roller, and a brush.

The mass of the resins contained in the three-dimensional object after the sintering step is 5% by mass or less of the mass of the resins contained in the three-dimensional object before the excessive powder removing step.

An example of a three-dimensional object producing apparatus used in the three-dimensional object producing method of the present disclosure will be described with reference to the drawings.

The flow of production of the three-dimensional object producing method of the present embodiment will be described with reference to FIG. 1A to FIG. 1E. FIG. 1A to FIG. 1E are exemplary diagrams illustrating a flow of production. The description will start from a state that a first object forming layer 30 has been formed over an object forming stage of an object forming tank. When forming the next object forming layer over the object forming layer 30, a supplying stage 23 of a supplying tank is lifted upward and an object forming stage 24 of an object forming tank is lifted downward as illustrated in FIG. 1A.

The distance by which the object forming stage 24 is lifted downward is set such that the interval (layer lamination pitch) between the upper surface of the surface (powder surface) of a powder layer 31 in the object forming tank 22 and the lower side (the lower tangential portion) of a flattening roller 12 is Δt1. The interval Δt1 is not particularly limited and is preferably about from several tens of micrometers through 100 micrometers.

In the present embodiment, the flattening roller 12 is disposed in a manner to have a gap from the upper surface of the supplying tank 21 and the object forming tank 22. Hence, when transferring and supplying a powder 20 to the object forming tank 22 and flattening the powder 20, the surface (powder surface) of the powder layer 31 is at a position higher than the upper surface of the supplying tank 21 and the object forming tank 22.

This makes it possible to infallibly prevent the flattening roller 12 from contacting the upper surface of the supplying tank 21 and the object forming tank 22, and to reduce damages of the flattening roller 12. If the surface of the flattening roller 12 is damaged, streaks may occur in the surface of a powder layer 31 and reduce flatness.

Figure 1B:
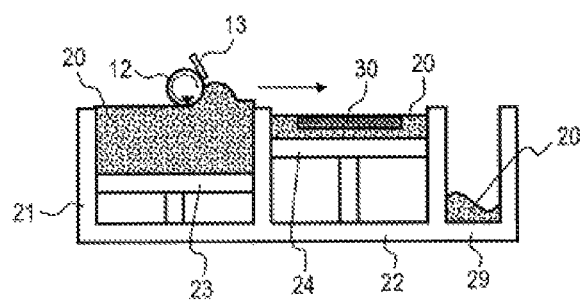
FIG. 1B is a schematic view illustrating another example operation of a three-dimensional object producing apparatus of the present disclosure.

Next, as illustrated in FIG. 1B, the flattening roller 12 is moved toward the object forming tank 22 while being rotated in a reverse direction (the direction of the arrow), to transfer and supply the powder 20 located above the upper surface level of the supplying tank 21 to the object forming tank 22 (supplying of powder).

Figure 1C:
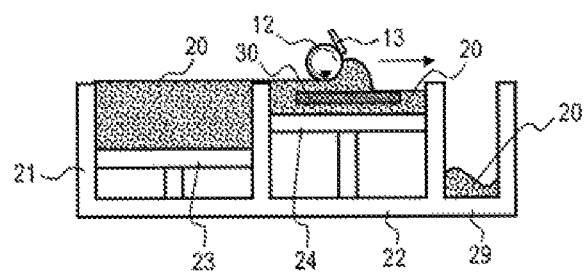
FIG. 1C is a schematic view illustrating another example operation of a three-dimensional object producing apparatus of the present disclosure.

Then, the flattening roller 12 is moved in parallel with the stage surface of the object forming stage 24 of the object forming tank 22 as illustrated in FIG. 1C, to form a powder layer 31 having a predetermined thickness Δt1 over the object forming layer 30 over the object forming stage 24 (flattening). Any excessive powder 20 that has not be used to form the powder layer 31 falls into an excessive powder receiving tank 29.

Figure 1D:
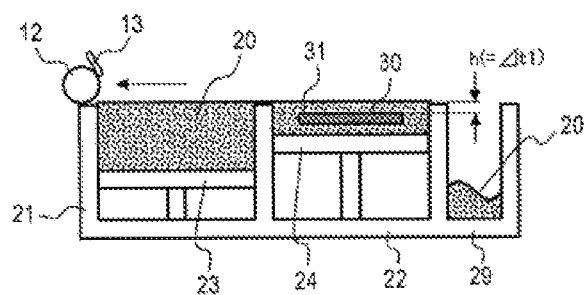
FIG. 1D is a schematic view illustrating another example operation of a three-dimensional object producing apparatus of the present disclosure.

After the powder layer 31 is formed, the flattening roller 12 is moved toward the supplying tank 21 and returned (restored) to the initial position (origin position) as illustrated in FIG. 1D.

The flattening roller 12 is configured to be able to move with a constant distance kept from the upper surface level of the object forming tank 22 and the supplying tank 21. With the ability to move keeping a constant distance, the flattening roller 12 can form a powder layer 31 having a uniform thickness h (corresponding to the layer lamination pitch Δt1) over the object forming tank 22 or over the object forming layer 30 already formed, while conveying the powder 20 to the top of the object forming tank 22.

In the following description, the thickness h of the powder layer 31 and the layer lamination pitch Δt1 may be described without distinction. Unless particularly specified, the thickness h of the powder layer 31 and the layer lamination pitch Δt1 refer to the same thickness and have the same meaning. The thickness h of the powder layer 31 may be obtained by actual measurement. In such a case, the thickness h is preferably an average of a plurality of positions.

Figure 1E:
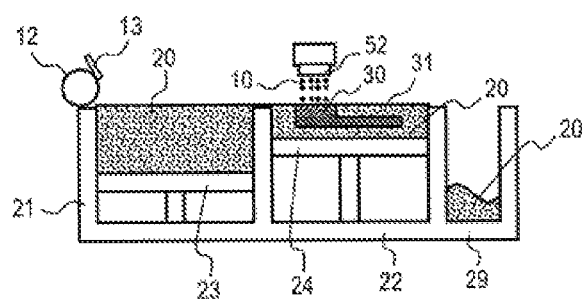
FIG. 1E is a schematic view illustrating another example operation of a three-dimensional object producing apparatus of the present disclosure.

Subsequently, as illustrated in FIG. 1E, liquid droplets 10 of an object forming liquid are discharged from a head 52 of a liquid discharging unit 50 to laminate and form an object forming layer 30 having a desired shape in the next powder layer 31 (object formation).

For example, the object forming layer 30 is formed through mixing of the liquid droplets 10 of the object forming liquid discharged from the head 52 with the powder 20 to dissolve the adhesive agent contained in the powder 20 and mutual binding of the dissolved adhesive agent components to bind the powder particles.

Next, the step of forming a powder layer and the discharging step described above are repeated, to form a new object forming layer 30. Here, the new object forming layer 30 and the underlying object forming layer 30 are integrated and constitute a part of an object (may also be referred to as a three-dimensional object or a stereoscopic object). Afterwards, the step of forming a powder layer and the discharging step are repeatedly performed, to complete production of the object.

The three-dimensional object producing method and apparatus of the present disclosure described above can produce a three-dimensional object having a complicated stereoscopic (three-dimensional (3D)) shape using the powder material for producing a three-dimensional object of the present disclosure or a kit for producing a three-dimensional objet of the present disclosure, easily, efficiently, without a shape collapse before, for example, sintering, and with a good dimensional accuracy.

A three-dimensional object obtained in this way, and a sintered body of the three-dimensional object have a sufficient strength and an excellent dimensional accuracy, can reproduce, for example, minute bosses and recesses and curved surfaces, have an excellent aesthetic appearance and a high quality, and can be suitably used for various applications.

(Kit for Producing Three-Dimensional Object)

A kit for producing a three-dimensional object of the present disclosure includes: a powder material for producing a three-dimensional object containing a base material, a resin, and resin particles; and a hardening liquid containing a hardening agent, and further includes other components as needed.

The kit for producing a three-dimensional object of the present disclosure includes the powder material for producing a three-dimensional object and the hardening liquid used in the three-dimensional object producing method and apparatus of the present disclosure, and further includes other components as needed.

In the kit for producing a three-dimensional object of the present disclosure, the hardening agent needs not be contained in the hardening liquid but may be provided in the form of a solid. Therefore, the kit may be provided as a product for mixing the solid with a solvent before use to prepare the hardening liquid.

The powder material for producing a three-dimensional object and the hardening liquid of the kit for producing a three-dimensional object of the present disclosure are the same as described in the description of the three-dimensional object producing method and the three-dimensional object producing apparatus of the present disclosure.

The kit for producing a three-dimensional object of the present disclosure can be suitably used for production of various compacts and structures, and can be particularly suitably used for the three-dimensional object producing method of the present disclosure, the three-dimensional object producing apparatus of the present disclosure, and a three-dimensional object obtained in the present disclosure.

When producing a structure using the kit for producing a three-dimensional object of the present disclosure, it is only needed to cause the hardening liquid to act on the powder material for producing a three-dimensional object and dry the resultant as needed, and it is possible to produce a structure having a complicated three-dimensional shape easily, efficiently, and with a good dimensional accuracy. The structure obtained in this way is a hardened product (three-dimensional object) having a sufficient hardness, and is excellent in treatability and handleability without a shape collapse even when carried in a hand, taken in and out from a mold, or blown with air to remove any excessive powder material for producing a three-dimensional object. The hardened product may be used as it is, or as a hardened product for sintering, may further be sintered to a compact (i.e., a sintered body of the three-dimensional object). When the sintering is performed, the compact obtained through the sintering will not include, for example, unnecessary voids, and a compact having a beautiful appearance can be easily obtained.

<Three-Dimensional Object>

A three-dimensional object obtained in the present disclosure is any of a hardened product obtained by applying the hardening liquid of the present disclosure to the powder material for producing a three-dimensional object of the present disclosure and a hardened product obtained by using the kit for producing a three-dimensional object of the present disclosure and applying the hardening liquid of the kit for producing a three-dimensional object to the powder material for producing a three-dimensional object of the kit for producing a three-dimensional object, and is an object before sintering such as pre-sintering precursor and a green body, and an object after sintering such as a sintered body and a compact.

The three-dimensional object is a product obtained merely by applying the hardening liquid to the powder material for producing a three-dimensional object, but has a sufficient strength. In the three-dimensional object, the base material is present densely (at a high filling ratio), and the organic materials are present only slightly between the base material particles to surround the base material particles. Therefore, when a compact (sintered body) is obtained afterwards through, for example, sintering, the amount of organic components that has been volatilized (degreased) can be saved unlike in existing hardened products of powders or particles obtained using, for example, adhesive agents, and the compact (sintered body) includes, for example, no unnecessary voids (traces of degreasing) and has a beautiful appearance.

For example, the three-dimensional object has such a strength as would not undergo, for example, shape collapse when rubbed on the surface, and as would not undergo, for example, cracking when blown with air from a distance of 5 cm using an air gun having a nozzle caliber of 2 mm and an air pressure of 0.4 MPa.

EXAMPLES

The present disclosure will be described below by way of Examples. However, the present disclosure should not be construed as being limited to these Examples.

—Preparation of Powder Material 1 for Producing Three-Dimensional Object—

—Preparation of Coating Liquid 1—

As presented in Table 1-1, polyvinyl butyral (obtained from Sekisui Chemical Co., Ltd. BM-5) (6 parts by mass) serving as the nonaqueous first resin (indicated as "No. 1" in Table 1-1) was mixed with toluene (114 parts by mass), and stirred for 1 hour using a three-one motor (obtained from Shinto Scientific Co., Ltd, BL600) while being heated to 50 degrees C. in a water bath, to dissolve the polyvinyl butyral in the organic solvent (toluene) and prepare a 5% by mass polyvinyl butyral solution (120 parts by mass). The prepared liquid obtained in this way was used as a coating liquid 1.

The viscosity of a 4% by mass (w/w %) solution of the polyvinyl butyral measured at 20 degrees C. using a viscometer (a rotational viscometer DV-E VISCOMETER HADVE TYPE 115 obtained from Brookfield Engineering) was from 5.0 mPa·s through 6.0 mPa·s.

—Coating of Coating Liquid 1 Over Surface of Base Material—

Next, using a commercially available coating machine (obtained from Powrex Corporation, MP-01), AlSi10Mg (obtained from Toyo Aluminium K.K., Si10Mg30BB, with a volume average particle diameter of 35 micrometers) (100 parts by mass) serving as the base material (indicated as "No. 1" in Table 1-1) was coated with the coating liquid 1 to have an average thickness (nm) of a coating film indicated in Table 1-1. During the coating, sampling was performed as needed to appropriately adjust the coating time and intervals in a manner that the average thickness (nm) of a coating film and the surface coating ratio (%) obtained by the coating liquid 1 would be the values indicated in Table 1-1.

After the coating was completed, resin particles of an acrylic resin (obtained from Soken Chemical & Engineering Co., Ltd., MP1451) were added to the resultant in an amount that would provide a surface coating ratio of 20% over the surface of the coating film, and mixed for 5 minutes at 100 rpm using a mixer (obtained from Shinmaru Enterprises Corporation, DYNO-MILL), to obtain a powder material 1 for producing a three-dimensional object. The measuring method for measuring the average thickness (nm) and the surface coating ratio (%) of the coating film and the coating conditions of the coating film are described below. The average thickness (nm) and the surface coating ratio (%) of the coating film were measured before mixing the resin particles.

<Average Thickness of Coating Film>

For the average thickness of the coating film, the surface of the powder material 1 for producing a three-dimensional object was polished with emery paper and lightly polished with a cloth impregnated with toluene to dissolve the coating resin and produce a sample for observation. Next, the boundary portion between the base material and the coating resin, exposed externally, was observed with a field emission-scanning electron microscope (FE-SEM), to measure the boundary portion as a coating thickness. The average of ten measured positions was calculated as the average thickness of the coating film.

<Surface Coating Ratio>

A backscattered electron image (ESB) was captured using a field emission-scanning electron microscope (FE-SEM) under the conditions described below with field of vision settings that would capture about ten particles of the powder material 1 for producing a three-dimensional object within a screen, and was binarized by image processing with IMAGE J software. Seeing a black portion as a coated portion and a white portion as a base material portion, area of black portions/(area of black portions+area of white portions)×100 was calculated per particle. Ten particles were measured, to obtain the average as the surface coating ratio (%).

—SEM Observation Conditions—

Signal: ESB (backscattered electron image)
EHT: 0.80 kV
ESB Grid: 700 V
WD: 3.0 mm
Aperture Size: 30.00 micrometers
Contrast: 80%
Magnification: set per sample in a manner that about ten particles would be contained in the horizontal direction of the screen <Coating Conditions>

Spray Settings
Nozzle type: 970
Nozzle diameter: 1.2 mm
Coating liquid discharging pressure: 4.7 Pass
Coating liquid discharging speed: 3 g/min
Amount of air atomized: 50 NL/min
Rotor Settings
Rotor type: M-1
Rotation speed: 60 rpm
Rotation number: 400%
Air Current Settings
Air feeding temperature: 80 degrees C.
Air feeding rate: 0.8 m$^3$/min
Bagfilter dusting pressure: 0.2 MPa
Bagfilter dusting time: 0.3 seconds
Bagfilter interval: 5 seconds
Coating Time
40 minutes The volume average particle diameter of the obtained powder material 1 for producing a three-dimensional object measured using a commercially available particle diameter measuring instrument (obtained from Nikkiso Co., Ltd., MICROTRAC HRA) was 35 micrometers.

<Measurement of Amount W of Remaining Carbon>

The powder material 1 for producing a three-dimensional object was heated under the conditions described below in a known vacuum degreasing furnace, to obtain the heated powder material 1 for producing a three-dimensional object.

Heating temperature: 450 degrees C.
Heating time: 2 hours
Heating environment: a vacuum of $10^{-2}$ Pa or lower
Temperature elevating speed: 200 degrees C./h The amount W of carbon remaining in the heated powder material 1 for producing a three-dimensional object was measured under the conditions described below using a carbon analyzer (EMIA-STEP) available from HORIBA, Ltd.

Purging time: 0 seconds, integration waiting time: 5 seconds, and integration time: 60 seconds
Comparator level: 1.0%, comparator waiting time: 15 seconds
Set temperature: 1,350 degrees C., time: 1,500 seconds,
Sample weight: 0.1 g
Combustion improver: tin (0.5 g)

When Ti was used as the base material, pure iron (0.5 g), tungsten (1.5 g), and tin (0.3 g) were used as the combustion improver.

<Minimum Ignition Energy>

The minimum ignition energy of the powder material 1 for producing a three-dimensional object was measured in the manner described below using a blow-up dust explosion tester (DES-10) and an ignition energy device (MIES-1).

(1) A sample in an amount balanced with the concentration was uniformly placed on a sample dish of the blow-up dust explosion tester.

(2) Compressor air of 50 kPa was stored in a 1.3 litter pressure tank and released into a glass cylinder via an electromagnetic valve, to form a dust cloud.

(3) The ignition energy was changed by selection of a capacitor and adjustment of a voltage applied.

(4) Lagging behind by 0.1 seconds from opening of the electromagnetic valve, energy was applied to a discharge electrode.

(5) The sample would be determined to be ignited when an ignition marking line drawn at a position that was 10 mm above the discharge electrode was surpassed by a flame.

(6) Three or more concentrations were measured, to obtain the minimum ignition energy. When ten times of measurement of one concentration at one energy failed to observe an ignition, it would be judged that there was no ignition at that concentration and energy.

[Evaluation Criteria]

B: The ignition energy was 100 mJ or higher (the risk of ignition by static electricity was low).

C: The ignition energy was 30 mJ or higher but 100 mJ or lower (it would be needed to take measures for chambers or installation, and to use an inert gas in order to better enhance safety).

D: The ignition energy was 30 mJ or lower (strict management would be needed, such as explosion suppression by an inert gas and an antistatic measures).

—Preparation of Hardening Liquid 1—

Dimethyl sulfoxide (97 parts by mass) and an acrylic resin for viscosity modification (obtained from Kyoeisha Chemical Co. Ltd., product name: KC1700P) (3 parts by mass) were subjected to dispersion treatment for 10 minutes using a homomixer, to prepare a hardening liquid 1 (indicated as "No. 1" in Table 1-2).

Example 1

Using the powder material 1 for producing a three-dimensional object and the hardening liquid 1 obtained, a three-dimensional object 1 was produced in the manner described below with a shape printing pattern having a size of 70 mm in length and 12 mm in width.

1) First, using a known powder additive manufacturing apparatus as illustrated in FIG. 1, the powder material 1 for producing a three-dimensional object was transferred from a supplying-side powder storing tank to a forming-side powder storing tank, to form a thin layer of the powder material 1 for producing a three-dimensional object having an average thickness of 100 micrometers over the support.

2) Next, the hardening liquid 1 was applied (discharged) from the nozzles of a known inkjet discharging head onto the surface of the formed thin layer of the powder material 1 for producing a three-dimensional object, to harden the powder material layer.

3) Next, the operations of 1) and 2) described above were repeated until a predetermined total average thickness of 3 mm was obtained, to sequentially laminate hardened thin layers of the powder material 1 for producing a three-dimensional object, and a drying step was performed using a dryer to maintain the resultant at 50 degrees C. for 4 hours and then at 100 degrees C. for 10 hours, to obtain a three-dimensional object 1.

The three-dimensional object 1 dried was blown with air to remove any excessive powder material 1 for producing a three-dimensional object.

Next, "strength (hardness) of three-dimensional object (before sintering)", "dimensional accuracy", and "sintered body density" were evaluated according to the evaluation criteria described below. The results are presented in Table 2.

<Strength (Hardness) of Three-Dimensional Object (Before Sintering)>

A: The three-dimensional object was sufficiently hardened and would not easily collapse.

B: Even when the three-dimensional object was strongly blown with air (0.6 MPa, 50 mm, 1 minute), only unnecessary powder material for producing a three-dimensional object would be removed, and the three-dimensional object per se could maintain the shape.

C: The three-dimensional object could be taken out from laminated powder material layers, any unnecessary powder material for producing a three-dimensional object could be removed with adjustment of the air blow pressure or using a brush, and the three-dimensional object could maintain the shape.

D: The powder material for producing a three-dimensional object was not sufficiently hardened, the three-dimensional object could not be taken out from laminated powder material layers, and when taken out, the three-dimensional object could not maintain the predetermined shape.

4) Using a dryer, the three-dimensional object 1 obtained in 3) described above was degreased through temperature elevation to 450 degrees C. for 2 hours and then temperature retention at 450 degrees C. for 2 hours in a nitrogen atmosphere, and then further sintered in a sintering furnace under a vacuum condition at 600 degrees C. As a result, a three-dimensional object 1 (sintered body) having a beautiful surface was obtained. This three-dimensional object 1 was a completely integrated aluminum structure (metal lump) and did not at all undergo, for example, breaking when slammed on a hard floor (concrete).

<Dimensional Accuracy>

A: The surface of the three-dimensional object was smooth, beautiful, and not warped.

B: The surface condition of the three-dimensional object was good, but had a slight warpage.

C: The surface of the three-dimensional object had a slight distortion and bosses and recesses.

D: The surface of the three-dimensional object had distortion, and when the surface was observed, lopsided presence of the base material and the organic materials was recognized.

<Sintered Body Density>

After the sintered body was impregnated with an oil under a vacuum, the density of the sintered body was measured by the Archimedes method and evaluated according to the evaluation criteria described below.

[Evaluation Criteria]

A: The density was 90% or higher.
B: The density was 80% or higher but lower than 90%.
C: The density was 70% or higher but lower than 80%.
D: The density was 70% or lower.

Example 2

A three-dimensional object 2 was produced in the same manner as in Example 1 except that unlike in Example 1, a powder material 2 for producing a three-dimensional object was prepared with change of the kind of the base material to titanium, and evaluated in the same manners as in Example 1. The results are presented in Table 2.

Example 3

A three-dimensional object 3 was produced in the same manner as in Example 1 except that unlike in Example 1, a hardening liquid 2 was prepared with change of the kind of the solvent of the hardening liquid to butyl acetate (obtained from Sankyo Chemical Co., Ltd.), and evaluated in the same manners as in Example 1. The results are presented in Table 2.

Example 4

A three-dimensional object 4 was produced in the same manner as in Example 1 except that unlike in Example 1, a hardening liquid 3 was prepared with change of the kind of the solvent of the hardening liquid to acetone (obtained from Hayashi Pure Chemical Ind., Ltd.), and evaluated in the same manners as in Example 1. The results are presented in Table 2.

Example 5

A three-dimensional object 5 was produced in the same manner as in Example 1 except that unlike in Example 1, a powder material 3 for producing a three-dimensional object was prepared with change of the nonaqueous first resin to KC-500 (acrylic, obtained from Kyoeisha Chemical Co., Ltd.), and evaluated in the same manners as in Example 1. The results are presented in Table 2.

Example 6

A three-dimensional object 6 was produced in the same manner as in Example 1 except that unlike in Example 1, a powder material 4 for producing a three-dimensional object was prepared with change of the nonaqueous first resin to TZ9515 (acrylic polyol, obtained from Toei Kasei Co., Ltd.), and evaluated in the same manners as in Example 1. The results are presented in Table 2.

Example 7

A three-dimensional object 7 was produced in the same manner as in Example 1 except that unlike in Example 1, a powder material 5 for producing a three-dimensional object was prepared with change of the nonaqueous first resin to UE-3380 (ester, obtained from Unitika Ltd.), and evaluated in the same manners as in Example 1. The results are presented in Table 2.

Example 8

A three-dimensional object 8 was produced in the same manner as in Example 1 except that unlike in Example 1, a powder material 6 for producing a three-dimensional object was prepared with change of the nonaqueous first resin to KS-1 (polyvinyl acetal, obtained from Sekisui Chemical Co., Ltd.), and evaluated in the same manners as in Example 1. The results are presented in Table 2.

Example 9

A three-dimensional object 9 was produced in the same manner as in Example 1 except that unlike in Example 1, a powder material 7 for producing a three-dimensional object was prepared with change of the kind of the resin particles to FS-107 ($NH_2$ group imparted as functional group of acrylic, obtained from Nippon Paint Industrial Coatings Co., Ltd.), and evaluated in the same manners as in Example 1. The results are presented in Table 2.

Example 10

A three-dimensional object 10 was produced in the same manner as in Example 1 except that unlike in Example 1, a powder material 8 for producing a three-dimensional object was prepared with change of the kind of the resin particles to FS-102 (styrene acrylic, obtained from Nippon Paint Industrial Coatings Co., Ltd.), and evaluated in the same manners as in Example 1. The results are presented in Table 2

Example 11

A three-dimensional object 11 was produced in the same manner as in Example 1 except that unlike in Example 1, a powder material 9 for producing a three-dimensional object was prepared with addition of the resin particles in a manner to obtain a surface coating ratio of 3%, and evaluated in the same manners as in Example 1. The results are presented in Table 2.

Example 12

A three-dimensional object 12 was produced in the same manner as in Example 1 except that unlike in Example 1, a powder material 10 for producing a three-dimensional object was prepared with addition of the resin particles in a manner to obtain a surface coating ratio of 5%, and evaluated in the same manners as in Example 1. The results are presented in Table 2.

Example 13

A three-dimensional object 13 was produced in the same manner as in Example 1 except that unlike in Example 1, a powder material 11 for producing a three-dimensional object was prepared with addition of the resin particles in a manner to obtain a surface coating ratio of 2%, and evaluated in the same manners as in Example 1. The results are presented in Table 2.

Example 14

A three-dimensional object 14 was produced in the same manner as in Example 1 except that unlike in Example 1, a powder material 12 for producing a three-dimensional object was prepared with addition of the resin particles in a manner to obtain a surface coating ratio of 50%, and evaluated in the same manners as in Example 1. The results are presented in Table 2.

Example 15

A three-dimensional object 15 was produced in the same manner as in Example 1 except that unlike in Example 1, a powder material 13 for producing a three-dimensional object having the average thickness (nm) of a coating film indicated in Table 1-1 was prepared with adjustment by change of the coating film forming time to 2 minutes, and evaluated in the same manners as in Example 1. The results are presented in Table 2.

Example 16

A three-dimensional object 16 was produced in the same manner as in Example 1 except that unlike in Example 1, a powder material 14 for producing a three-dimensional object having the average thickness (nm) of a coating film indicated in Table 1-1 was prepared with adjustment by change of the coating time to 4 minutes, and evaluated in the same manners as in Example 1. The results are presented in Table 2.

Example 17

A three-dimensional object 17 was produced in the same manner as in Example 1 except that unlike in Example 1, a powder material 15 for producing a three-dimensional object having the average thickness (nm) of a coating film indicated in Table 1-1 was prepared with adjustment by change of the coating time to 200 minutes, and evaluated in the same manners as in Example 1. The results are presented in Table 2.

Example 18

A three-dimensional object 18 was produced in the same manner as in Example 1 except that unlike in Example 1, a powder material 16 for producing a three-dimensional object having the average thickness (nm) of a coating film indicated in Table 1-1 was prepared with adjustment by change of the coating time to 240 minutes, and evaluated in the same manners as in Example 1. The results are presented in Table 2.

Example 19

A three-dimensional object 19 was produced in the same manner as in Example 1 except that unlike in Example 1, a powder material 17 for producing a three-dimensional object having the average thickness (nm) of a coating film indicated in Table 1-1 was prepared with adjustment by change of the coating time to 320 minutes, and evaluated in the same manners as in Example 1. The results are presented in Table 2.

Example 20

A three-dimensional object 15 was produced in the same manner as in Example 1 except that unlike in Example 1, a powder material 18 for producing a three-dimensional object having the average thickness (nm) of a coating film indicated in Table 1-1 was prepared with adjustment by change of the coating time to 360 minutes, and evaluated in the same manners as in Example 1. The results are presented in Table 2.

Example 21

A three-dimensional object 21 was produced in the same manner as in Example 1 except that unlike in Example 1, a powder material 19 for producing a three-dimensional object having the surface coating ratio of resin indicated in Table 1-1 was prepared with adjustment by change of the coating liquid flow rate to 15 g/min for acceleration to increase coating unevenness of a coating film, and evaluated in the same manners as in Example 1. The results are presented in Table 2.

Example 22

A three-dimensional object 22 was produced in the same manner as in Example 1 except that unlike in Example 1, a powder material 20 for producing a three-dimensional object having the surface coating ratio of resin indicated in Table 1-1 was prepared with adjustment by change of the coating liquid flow rate to 13 g/min for acceleration to increase coating unevenness of a coating film, and evaluated in the same manners as in Example 1. The results are presented in Table 2.

Example 23

A three-dimensional object 23 was produced in the same manner as in Example 1 except that unlike in Example 1, a powder material 21 for producing a three-dimensional object having the volume average particle diameter of base material and the ratio of particles having a volume-based particle diameter of 10 micrometers or less indicated in Table 1-1 was prepared with classification of AlSi10Mg used through a sieve having a mesh size of #795, and evaluated in the same manners as in Example 1. The results are presented in Table 2.

Example 24

A three-dimensional object 24 was produced in the same manner as in Example 1 except that unlike in Example 1, a powder material 22 for producing a three-dimensional object having the volume average particle diameter of base material and the ratio of particles having a volume-based particle diameter of 10 micrometers or less indicated in Table 1-1 was prepared with classification of AlSi10Mg used through a sieve having a mesh size of #795, and evaluated in the same manners as in Example 1. The results are presented in Table 2.

Example 25

A three-dimensional object 25 was produced in the same manner as in Example 1 except that unlike in Example 1, the volume average particle diameter of AlSi10Mg used was set to 8 micrometers to prepare a powder material 23 for producing a three-dimensional object, and evaluated in the same manners as in Example 1. The results are presented in Table 2.

Example 26

A three-dimensional object 26 was produced in the same manner as in Example 1 except that unlike in Example 1, the volume average particle diameter of AlSi10Mg used was set to 50 micrometers to prepare a powder material 24 for producing a three-dimensional object, and evaluated in the same manners as in Example 1. The results are presented in Table 2.

Example 27

A three-dimensional object 27 was produced in the same manner as in Example 1 except that unlike in Example 1, the volume average particle diameter of AlSi10Mg used was set to 60 micrometers to prepare a powder material 25 for producing a three-dimensional object, and evaluated in the same manners as in Example 1. The results are presented in Table 2.

Example 28

A three-dimensional object 28 was produced in the same manner as in Example 1 except that unlike in Example 1, the volume average particle diameter of AlSi10Mg used was set to 80 micrometers to prepare a powder material 26 for producing a three-dimensional object, and evaluated in the same manners as in Example 1. The results are presented in Table 2.

Example 29

A three-dimensional object 29 was produced in the same manner as in Example 1 except that unlike in Example 1, the volume average particle diameter of AlSi10Mg used was to 90 micrometers to prepare a powder material 27 for producing a three-dimensional object, and evaluated in the same manners as in Example 1. The results are presented in Table 2.

Example 30

A three-dimensional object 30 was produced in the same manner as in Example 1 by producing a powder material 28 for producing a three-dimensional object in the same manner as in Example 1 except that unlike in Example 1, MX-80H3WT (acrylic, obtained from Soken Chemical & Engineering Co., Ltd., with a volume average particle diameter of 500 nm (prepared through air current classification)) was used as the resin particles, and evaluated in the same manners as in Example 1. The results are presented in Table 2.

Example 31

A three-dimensional object 31 was produced in the same manner as in Example 1 by producing a powder material 29 for producing a three-dimensional object in the same manner as in Example 1 except that unlike in Example 1, MX-80H3WT (acrylic, obtained from Soken Chemical & Engineering Co., Ltd., with a volume average particle diameter of 600 nm (prepared through air current classification)) was used as the resin particles, and evaluated in the same manners as in Example 1. The results are presented in Table 2.

Example 32

A three-dimensional object 31 was produced in the same manner as in Example 1 by producing a powder material 30 for producing a three-dimensional object in the same manner as in Example 1 except that unlike in Example 1, MX-80H3WT (acrylic, obtained from Soken Chemical & Engineering Co., Ltd., with a volume average particle diameter of 800 nm (prepared through air current classification)) was used as the resin particles, and evaluated in the same manners as in Example 1. The results are presented in Table 2.

Comparative Example 1

A three-dimensional object 33 was produced in the same manner as in Example 1 by producing a powder material 31 for producing a three-dimensional object in the same manner as in Example 1 except that unlike in Example 1, the base material was not coated with the nonaqueous first resin, and evaluated in the same manners as in Example 1. The results are presented in Table 2.

Comparative Example 2

A three-dimensional object 34 was produced in the same manner as in Example 1 by producing a powder material 32 for producing a three-dimensional object in the same manner as in Example 1 except that unlike in Example 1, the resin particles were not coated, and evaluated in the same manners as in Example 1. The results are presented in Table 2.

Comparative Example 3

A three-dimensional object 35 was produced in the same manner as in Example 1 except that a powder material 33 for producing a three-dimensional object was prepared with change of the nonaqueous first resin to TH-500 (polyvinyl chloride, obtained from Taiyo Vinyl Corporation, with an amount of weight reduction through heating at 400 degrees C. by TG-DTA: 50%, presence/absence of remaining carbon after heating to 550 degrees C.: present), and evaluated in the same manners as in Example 1. The results are presented in Table 2.

Comparative Example 4

A three-dimensional object 36 was produced in the same manner as in Example 1 except that unlike in Example 1, a powder material 34 for producing a three-dimensional object was prepared with change of the kind of the resin particles to EPOSTER SS (melamine, obtained from Nippon Shokubai Co., Ltd., with an amount of weight reduction through heating at 400 degrees C. by TG-DTA: 70%, presence/absence of remaining carbon after heating to 550 degrees C.: present), and evaluated in the same manners as in Example 1. The results are presented in Table 2.

Comparative Example 5

A three-dimensional object 37 was produced in the same manner as in Example 1 except that unlike in Example 1, a powder material 35 for producing a three-dimensional object was prepared using, as the nonaqueous first resin, DF-05 (acrylic, obtained from Japan Vam & Poval Co., Ltd., with an amount of weight reduction through heating at 400 degrees C. by TG-DTA: 90%, presence/absence of remaining carbon after heating to 550 degrees C.: present), and a hardening liquid 4 was prepared with change of the kind of the solvent to purified water, and evaluated in the same manners as in Example 1. The results are presented in Table 2.

TABLE 1-1

| | | | Powder material for producing three-demensional object | | | | |
|---|---|---|---|---|---|---|---|
| | | | Base material | | | Resin | |
| | | 3D Object No. | Kind | Volume average particle diameter (micrometer) | Ratio of particles with volume-based particle diameter of ≤10 micrometers | Kind of first resin | Average thickness (nm) of coating film | Surface coating ratio |
| Ex. | 1 | 1 | AlSi10Mg | 35 | 15% | Polyvinyl butyral | 100 | 60% |
| | 2 | 2 | Pure Ti | 28 | 15% | Polyvinyl butyral | 100 | 60% |
| | 3 | 1 | AlSi10Mg | 35 | 15% | Polyvinyl butyral | 100 | 60% |
| | 4 | 1 | AlSi10Mg | 35 | 15% | Polyvinyl butyral | 100 | 60% |
| | 5 | 3 | AlSi10Mg | 35 | 15% | Acrylic | 100 | 60% |
| | 6 | 4 | AlSi10Mg | 35 | 15% | Acrylic polyol | 100 | 60% |
| | 7 | 5 | AlSi10Mg | 35 | 15% | Ester | 100 | 60% |
| | 8 | 6 | AlSi10Mg | 35 | 15% | Polyvinyl acetal | 100 | 60% |
| | 9 | 7 | AlSi10Mg | 35 | 15% | Polyvinyl butyral | 100 | 60% |
| | 10 | 8 | AlSi10Mg | 35 | 15% | Polyvinyl butyral | 100 | 60% |
| | 11 | 9 | AlSi10Mg | 35 | 15% | Polyvinyl butyral | 100 | 60% |
| | 12 | 10 | AlSi10Mg | 35 | 15% | Polyvinyl butyral | 100 | 60% |
| | 13 | 11 | AlSi10Mg | 35 | 15% | Polyvinyl butyral | 100 | 60% |
| | 14 | 12 | AlSi10Mg | 35 | 15% | Polyvinyl butyral | 100 | 60% |
| | 15 | 13 | AlSi10Mg | 35 | 15% | Polyvinyl butyral | 5 | 60% |
| | 16 | 14 | AlSi10Mg | 35 | 15% | Polyvinyl butyral | 10 | 60% |
| | 17 | 15 | AlSi10Mg | 35 | 15% | Polyvinyl butyral | 500 | 60% |
| | 18 | 16 | AlSi10Mg | 35 | 15% | Polyvinyl butyral | 600 | 60% |
| | 19 | 17 | AlSi10Mg | 35 | 15% | Polyvinyl butyral | 800 | 60% |
| | 20 | 18 | AlSi10Mg | 35 | 15% | Polyvinyl butyral | 900 | 60% |
| | 21 | 19 | AlSi10Mg | 35 | 15% | Polyvinyl butyral | 100 | 10% |
| | 22 | 20 | AlSi10Mg | 35 | 15% | Polyvinyl butyral | 100 | 15% |
| | 23 | 21 | AlSi10Mg | 42 | 1% | Polyvinyl butyral | 100 | 60% |
| | 24 | 22 | AlSi10Mg | 41 | 2% | Polyvinyl butyral | 100 | 60% |
| | 25 | 23 | AlSi10Mg | 8 | 65% | Polyvinyl butyral | 100 | 60% |
| | 26 | 24 | AlSi10Mg | 50 | 8% | Polyvinyl butyral | 100 | 60% |

TABLE 1-1-continued

| | | | Powder material for producing three-demensional object | | | | | |
|---|---|---|---|---|---|---|---|---|
| | | | Base material | | | | Resin | |
| | | 3D Object No. | Kind | Volume average particle diameter (micrometer) | Ratio of particles with volume-based particle diameter of ≤10 micrometers | Kind of first resin | Average thickness (nm) of coating film | Surface coating ratio |
| | 27 | 25 | AlSi10Mg | 60 | 6% | Polyvinyl butyral | 100 | 60% |
| | 28 | 26 | AlSi10Mg | 80 | 5% | Polyvinyl butyral | 100 | 60% |
| | 29 | 27 | AlSi10Mg | 90 | 3% | Polyvinyl butyral | 100 | 60% |
| | 30 | 28 | AlSi10Mg | 35 | 15% | Polyvinyl butyral | 100 | 60% |
| | 31 | 29 | AlSi10Mg | 35 | 15% | Polyvinyl butyral | 100 | 60% |
| | 32 | 30 | AlSi10Mg | 35 | 15% | Polyvinyl butyral | 100 | 60% |
| Comp. Ex. | 1 | 31 | AlSi10Mg | 35 | 15% | None | — | — |
| | 2 | 32 | AlSi10Mg | 35 | 15% | Polyvinyl butyral | 100 | 60% |
| | 3 | 33 | AlSi10Mg | 35 | 15% | Polyvinyl chloride | 100 | 60% |
| | 4 | 34 | AlSi10Mg | 35 | 15% | Polyvinyl butyral | 100 | 60% |
| | 5 | 35 | AlSi10Mg | 35 | 15% | Polyvinyl alcohol | 100 | 60% |

TABLE 1-2

| | | | Powder material for producing three-demensional object | | | | |
|---|---|---|---|---|---|---|---|
| | | | Resin particles | | | Hardening liquid | |
| | | Kind of second resin | Volume average particle diameter (nm) | Surface coating ratio | Amount W of carbon residue | No. | Solvent Kind |
| Ex. | 1 | Acrylic | 150 | 20% | 0.24 | 1 | DMSO |
| | 2 | Acrylic | 150 | 20% | 0.13 | 1 | DMSO |
| | 3 | Acrylic | 150 | 20% | 0.25 | 2 | Butyl acetate |
| | 4 | Acrylic | 150 | 20% | 0.23 | 3 | Acetone |
| | 5 | Acrylic | 150 | 20% | 0.07 | 1 | DMSO |
| | 6 | Acrylic | 150 | 20% | 0.08 | 1 | DMSO |
| | 7 | Acrylic | 150 | 20% | 0.13 | 1 | DMSO |
| | 8 | Acrylic | 150 | 20% | 0.26 | 1 | DMSO |
| | 9 | Acrylic with NH$_2$ functional group | 150 | 20% | 0.27 | 1 | DMSO |
| | 10 | Styrene acrylic | 150 | 20% | 0.25 | 1 | DMSO |
| | 11 | Acrylic | 150 | 3% | 0.22 | 1 | DMSO |
| | 12 | Acrylic | 150 | 5% | 0.22 | 1 | DMSO |
| | 13 | Acrylic | 150 | 2% | 0.21 | 1 | DMSO |
| | 14 | Acrylic | 150 | 50% | 0.27 | 1 | DMSO |
| | 15 | Acrylic | 150 | 20% | 0.07 | 1 | DMSO |
| | 16 | Acrylic | 150 | 20% | 0.08 | 1 | DMSO |
| | 17 | Acrylic | 150 | 20% | 0.29 | 1 | DMSO |
| | 18 | Acrylic | 150 | 20% | 0.30 | 1 | DMSO |
| | 19 | Acrylic | 150 | 20% | 0.31 | 1 | DMSO |
| | 20 | Acrylic | 150 | 20% | 0.31 | 1 | DMSO |
| | 21 | Acrylic | 150 | 20% | 0.24 | 1 | DMSO |
| | 22 | Acrylic | 150 | 20% | 0.23 | 1 | DMSO |
| | 23 | Acrylic | 150 | 20% | 0.22 | 1 | DMSO |
| | 24 | Acrylic | 150 | 20% | 0.21 | 1 | DMSO |
| | 25 | Acrylic | 150 | 20% | 0.33 | 1 | DMSO |
| | 26 | Acrylic | 150 | 20% | 0.20 | 1 | DMSO |
| | 27 | Acrylic | 150 | 20% | 0.18 | 1 | DMSO |
| | 28 | Acrylic | 150 | 20% | 0.18 | 1 | DMSO |
| | 29 | Acrylic | 150 | 20% | 0.17 | 1 | DMSO |
| | 30 | Acrylic | 500 | 20% | 0.26 | 1 | DMSO |
| | 31 | Acrylic | 600 | 20% | 0.26 | 1 | DMSO |
| | 32 | Acrylic | 800 | 20% | 0.27 | 1 | DMSO |
| Comp. Ex. | 1 | Acrylic | 150 | 20% | 0.02 | 1 | DMSO |
| | 2 | None | — | — | 0.23 | 1 | DMSO |
| | 3 | Acrylic | 150 | 20% | 0.89 | 1 | DMSO |
| | 4 | Melamine | 150 | 20% | 0.40 | 1 | DMSO |
| | 5 | Acrylic | 150 | 20% | 0.59 | 4 | Purified water |

The details of the materials used in Examples and Comparative Examples are as follows.

—Base Material—
AlSi10Mg: obtained from Toyo Aluminium K.K., product name: Si10Mg30BB
Pure Ti: obtained from OSAKA Titanium Technologies, Co., Ltd., product name: TILOP64-45

—Nonaqueous First Resin—
Polyvinyl butyral: obtained from Sekisui Chemical Co., Ltd., product name: BM-2
Acrylic resin: obtained from DIC Corporation, product name: AU-7007
Ester resin: obtained from DIC Corporation, product name: TARISBON AH-420
Acrylic polyol resin: obtained from Toeikasei Co., Ltd., product name: TZ9515
Polyvinyl acetal resin: obtained from Sekisui Chemical Co., Ltd., product name: KS-1

—Second Resin—
Acrylic resin: obtained from Soken Chemical & Engineering Co., Ltd., product name: MP-1451
Melamine resin: obtained from Nippon Shokubai Co., Ltd., product name: EPOSTER SS
Styrene acrylic resin: obtained from Nippon Paint Industrial Coatings Co., Ltd., product name: FS-102
Acrylic resin (with $NH_2$ functional group): obtained from Nippon Paint Industrial Coatings Co., Ltd., product name: FS-107

From Tables 1-1 and 1-2 and Table 2, it was revealed that Examples 1 and 3 to 32 in which an alloy (AlSi10Mg) was used as the base material resulted in an amount W (mass %) of remaining carbon of less than 0.34, and Example 2 in which titanium was used as the base material resulted in an amount W (mass %) of remaining carbon of less than 0.2. As can be seen, Examples 1 to 32 achieved good evaluation results in "strength", "dimensional accuracy", "sintered density", and "minimum ignition E".

Aspects of the present disclosure are, for example, as follows.

<1> A powder material for producing a three-dimensional object, the powder material including:
a base material;
a resin; and
resin particles,
wherein an amount W (mass %) of carbon remaining in the powder material after heating in a vacuum of $10^{-2}$ Pa or lower at 450 degrees C. for 2 hours satisfies the following formula: W (mass %)<0.9/M, where M represents the specific gravity of the base material.

<2> The powder material for producing a three-dimensional object according to <1>,
wherein the resin includes a nonaqueous first resin, and
wherein the powder material includes a coating film formed of the resin and coating the surface of the base material.

TABLE 2

| | | | Evaluation result | | | |
|---|---|---|---|---|---|---|
| | | Three-dimensional object No. | Strength | Dimensional accuracy | Sintered density | Minimum ignition E |
| Ex. | 1 | 1 | A | A | A | B |
| | 2 | 2 | A | A | A | B |
| | 3 | 3 | A | A | A | B |
| | 4 | 4 | A | B | A | B |
| | 5 | 5 | B | A | A | B |
| | 6 | 6 | B | A | A | B |
| | 7 | 7 | B | A | A | B |
| | 8 | 8 | A | A | B | B |
| | 9 | 9 | A | A | B | B |
| | 10 | 10 | A | A | A | B |
| | 11 | 11 | B | B | A | B |
| | 12 | 12 | A | B | A | B |
| | 13 | 13 | C | C | A | B |
| | 14 | 14 | A | A | B | B |
| | 15 | 15 | C | A | A | C |
| | 16 | 16 | B | A | A | B |
| | 17 | 17 | A | B | A | B |
| | 18 | 18 | A | B | B | B |
| | 19 | 19 | A | B | B | B |
| | 20 | 20 | A | C | C | B |
| | 21 | 21 | C | A | A | C |
| | 22 | 22 | B | A | A | B |
| | 23 | 23 | A | C | A | B |
| | 24 | 24 | A | B | A | B |
| | 25 | 25 | A | A | A | B |
| | 26 | 26 | A | B | A | B |
| | 27 | 27 | B | B | A | B |
| | 28 | 28 | A | B | A | B |
| | 29 | 29 | A | C | A | B |
| | 30 | 30 | B | B | B | B |
| | 31 | 31 | B | B | B | B |
| | 32 | 32 | C | C | B | B |
| Comp. Ex. | 1 | 33 | D | D | A | D |
| | 2 | 34 | C | D | A | B |
| | 3 | 35 | C | C | D | B |
| | 4 | 36 | B | B | D | B |
| | 5 | 37 | B | C | D | B |

<3> The powder material for producing a three-dimensional object according to <2>,
wherein the resin particles include a second resin, and
wherein the powder material includes the resin particles over the coating film.
<4> The powder material for producing a three-dimensional object according to <3>,
wherein a coating ratio of the resin particles over the surface of the base material coated with the coating film is 3% or higher.
<5> The powder material for producing a three-dimensional object according to any one of <1> to <4>,
wherein a volume average particle diameter of the resin particles is 600 nm or less.
<6> The powder material for producing a three-dimensional object according to any one of <1> to <5>,
wherein the base material includes at least one selected from the group consisting of Al, Ti, and copper.
<7> The powder material for producing a three-dimensional object according to any one of <1> to <6>,
wherein the resin particles include at least one selected from the group consisting of acrylic, styrene, and amino.
<8> The powder material for producing a three-dimensional object according to any one of <2> to <7>,
wherein the nonaqueous first resin includes at least one selected from the group consisting of acrylic, acrylic polyol, polyester, epoxy, polyol, urethane, polyether, polyvinyl butyral, polyvinyl acetal, polyvinyl chloride, vinyl acetate, paraffin/olefin, and ethyl cellulose, and
wherein the nonaqueous first resin has a water solubility of 0.5 (g/100 g-$H_2O$) or less.
<9> The powder material for producing a three-dimensional object according to any one of <2> to <8>,
wherein the coating film has an average thickness of 10 nm or greater but 800 nm or less.
<10> The powder material for producing a three-dimensional object according to any one of <2> to <9>,
wherein a surface coating ratio at which the coating film coats the base material is 15% or higher.
<11> The powder material for producing a three-dimensional object according to any one of <1> to <10>,
wherein a content of the base material having a volume average particle diameter of 10 micrometers or less relative to a total amount of the base material is 1.5% or greater.
<12> The powder material for producing a three-dimensional object according to any one of <1> to <11>,
wherein a volume average particle diameter of the powder material for producing a three-dimensional object is 2 micrometers or greater but 80 micrometers or less.
<13> A three-dimensional object producing method including:
forming a powder material layer using a powder material for producing a three-dimensional object, wherein the powder material includes: a base material; a resin; and resin particles, and wherein an amount W (mass %) of carbon remaining in the powder material after heating in a vacuum of $10^{-2}$ Pa or lower at 450 degrees C. for 2 hours satisfies the following formula: W (mass %)<0.9/M, where M represents the specific gravity of the base material; and
applying a hardening liquid to the powder material layer to form a hardened product.
<14> The three-dimensional object producing method according to <13>,
wherein the resin includes a nonaqueous first resin, and
wherein the powder material for producing a three-dimensional object includes a coating film formed of the resin and coating the surface of the base material.

<15> The three-dimensional object producing method according to <14>,
wherein the resin particles include a second resin, and
wherein the powder material for producing a three-dimensional object includes the resin particles over the coating film.
<16> The three-dimensional object producing method according to any one of <13> to <15>,
wherein the hardening liquid is an organic solvent, and
wherein the organic solvent includes in a molecular framework thereof, at least one selected from the group consisting of aliphatic compounds, aromatic compounds, ketones, esters, and sulfoxides.
<17> The three-dimensional object producing method according to any one of <13> to <16>,
wherein the resin particles dissolve in the hardening liquid by greater than or equal to ¼ of a diameter of the resin particles.
<18> The three-dimensional object producing method according to any one of <13> to <17>, further including after the applying, sintering the hardened product.
<19> The three-dimensional object producing method according to any one of <13> to <18>,
wherein in the applying, the hardening liquid is applied by an inkjet method.
<20> A three-dimensional object producing apparatus including:
a powder material layer forming unit configured to form a powder material layer using a powder material for producing a three-dimensional object, wherein the powder material includes: a base material; a resin; and resin particles, and wherein an amount W (mass %) of carbon remaining in the powder material after heating in a vacuum of $10^{-2}$ Pa or lower at 450 degrees C. for 2 hours satisfies the following formula: W (mass %)<0.9/M, where M represents the specific gravity of the base material; and
a hardened product forming unit configured to apply a hardening liquid to the powder material layer to form a hardened product.
<21> A kit for producing a three-dimensional object, the kit including:
the powder material for producing a three-dimensional object according to any one of <1> to <12>; and
a hardening liquid including a hardening agent.
The powder material for producing a three-dimensional object according to any one of <1> to <12>, the three-dimensional object producing method according to any one of <13> to <19>, the three-dimensional object producing apparatus according to <20>, and the kit for producing a three-dimensional object according to <21> can achieve the object of the present disclosure.

What is claimed is:
1. A powder material for producing a three-dimensional object,
the powder material comprising:
a metal or ceramic base material;
a resin,
wherein the resin comprises a nonaqueous first resin,
wherein the powder material comprises a coating film formed of the resin and coating a surface of the base material,
wherein the nonaqueous first resin comprises at least one resin selected from the group consisting of acrylic, acrylic polyol, polyester, epoxy, polyol, urethane, polyether, polyvinyl butyral, polyvinyl acetal, polyvinyl chloride, vinyl acetate, paraffin/olefin, and ethyl cellulose, and wherein the nonaqueous first resin has a water solubility of 0.5 (g/100 g·H$_2$O) or less; and resin particles, wherein the resin particles comprise a second resin, and wherein the powder material comprises the resin particles over the coating film, wherein the second resin comprises at least one resin selected from the group consisting of acrylic, styrene, and amino, wherein an amount W (mass %) of carbon remaining in the powder material after heating in a vacuum of 10$^{-2}$ Pa or lower at 450 degrees C. for 2 hours satisfies a formula: W(mass %)<0.9/M, where M represents a specific gravity (g/cm$^3$) of the base material, wherein W is measured with heating conditions:

heating temperature: 450 degrees C., heating time: 2 hours, heating environment: in a vacuum of 10$^{-2}$ Pa or lower, temperature elevating rate: 200 degrees C./h, and the amount W (mass %) measurement conditions using a carbon analyzer are:

purging time: 0 seconds, integration waiting time: 5 seconds, and integration time: 60 seconds, comparator level: 1.0%, comparator waiting time: 15 seconds, set temperature: 1.350 degrees C. time: 1,500 seconds, sample weight: 0.1 g, combustion improver: tin (0.5 g) or, when Ti is used as the base material, pure iron (0.5 g), tungsten (1.5 g), and tin (0.3 g).

2. The powder material for producing a three-dimensional object according to claim 1, wherein a coating ratio of the resin particles over the surface of the base material coated with the coating film is 3% or higher.

3. The powder material for producing a three-dimensional object according to claim 1, wherein a volume average particle diameter of the resin particles is 600 nm or less.

4. The powder material for producing a three-dimensional object according to claim 1, wherein the base material comprises at least one selected from the group consisting of Al, Ti, and copper.

5. The powder material for producing a three-dimensional object according to claim 1, wherein the coating film has an average thickness of 10 nm or greater but 800 nm or less.

6. The powder material for producing a three-dimensional object according to claim 1, wherein a surface coating ratio at which the coating film coats the base material is 15% or higher.

7. The powder material for producing a three-dimensional object according to claim 1, wherein a content of the base material having a volume average particle diameter of 10 micrometers or less relative to a total amount of the base material is 1.5% or greater.

8. The powder material for producing a three-dimensional object according to claim 1, wherein a volume average particle diameter of the powder material for producing a three-dimensional object is 2 micrometers or greater but 80 micrometers or less.

9. The powder material for producing a three-dimensional object according to claim 1, wherein the base material comprises an aluminum alloy and W is lower than 0.34.

10. The powder material for producing a three-dimensional object according to claim 1, wherein the base material comprises titanium and W is lower than 0.20.

11. The powder material for producing a three-dimensional object according to claim 1, wherein the nonaqueous first resin comprises polyvinyl butyral.

12. The powder material for producing a three-dimensional object according to claim 1, wherein the second resin comprises acrylic.

13. The powder material for producing a three-dimensional object according to claim 11, wherein the second resin comprises acrylic.

14. The powder material for producing a three-dimensional object according to claim 11, wherein the base material comprises AlSi10Mg.

15. A three-dimensional object producing method comprising:

forming a powder material layer using a powder material for producing a three-dimensional object according to claim 1, applying a hardening liquid to the powder material layer to form a hardened product.

16. The three-dimensional object producing method according to claim 15, wherein the hardening liquid is an organic solvent, and wherein the organic solvent comprises in a molecular framework thereof, at least one selected from the group consisting of aliphatic compounds, aromatic compounds, ketones, esters, and sulfoxides.

17. The three-dimensional object producing method according to claim 15, wherein the resin particles dissolve in the hardening liquid by greater than or equal to ¼ of a diameter of the resin particles.

18. The three-dimensional object producing method according to claim 15, further comprising after the applying, sintering the hardened product.

19. A three-dimensional object producing apparatus, comprising:

a powder material layer forming unit configured to form a powder material layer using a powder material for producing a three-dimensional object according to claim 1, and a hardened product forming unit configured to apply a hardening liquid to the powder material layer to form a hardened product.

20. A kit for producing a three-dimensional object, the kit comprising:

the powder material for producing a three-dimensional object according to claim 1; and a hardening liquid that comprises a hardening agent.

* * * * *